(12) United States Patent
Schulte et al.

(10) Patent No.: US 10,281,066 B2
(45) Date of Patent: May 7, 2019

(54) FLUSH THREADED CONNECTION AND METHOD OF FORMING AND USING THE FLUSH THREADED CONNECTION

(71) Applicant: Houston International Specialty, Inc., Spring, TX (US)

(72) Inventors: Warren Harold Schulte, Porter, TX (US); Aubrey Coy Reece, Montgomery, TX (US)

(73) Assignee: HOUSTON INTERNATIONAL SPECIALTY, INC., Spring, TX (US)

( * ) Notice: Subject to any disclaimer, the term of this patent is extended or adjusted under 35 U.S.C. 154(b) by 179 days.

(21) Appl. No.: 14/201,054

(22) Filed: Mar. 7, 2014

(65) Prior Publication Data
US 2015/0252921 A1 Sep. 10, 2015

(51) Int. Cl.
*F16L 15/06* (2006.01)
*F16L 15/00* (2006.01)

(52) U.S. Cl.
CPC ............. *F16L 15/06* (2013.01); *F16L 15/001* (2013.01)

(58) Field of Classification Search
CPC ...... F16L 15/004; F16L 15/005; F16L 15/001
USPC .................................................. 285/333, 334
See application file for complete search history.

(56) References Cited

U.S. PATENT DOCUMENTS

| | | | |
|---|---|---|---|
| 2,258,066 A * | 10/1941 | Oyen | E21B 17/08 285/328 |
| 4,577,895 A * | 3/1986 | Castille | E21B 17/0423 285/334 |
| 4,707,001 A | 11/1987 | Johnson | |
| 4,822,081 A | 4/1989 | Blose | |
| 5,066,052 A * | 11/1991 | Read | E21B 17/042 285/334 |
| 5,092,635 A | 3/1992 | DeLange et al. | |
| 5,810,401 A | 9/1998 | Mosing et al. | |
| 6,010,163 A * | 1/2000 | Cerruti | E21B 17/042 285/333 |
| 6,047,997 A * | 4/2000 | Olivier | F16L 15/08 285/331 |
| 6,120,067 A | 9/2000 | Mosing et al. | |
| 6,322,110 B1 | 11/2001 | Banker et al. | |
| 6,409,175 B1 | 6/2002 | Evans et al. | |
| 6,442,826 B1 | 9/2002 | Staudt et al. | |
| 6,485,061 B1 | 11/2002 | Mosing et al. | |
| 7,384,075 B2 * | 6/2008 | Ress, Jr. | F01D 11/00 285/333 |

(Continued)

*Primary Examiner* — Brent W Herring

(57) ABSTRACT

Embodiments provide a flush fluid connection having a first fluid connector having a male connector end including an elongated nose section having a front surface and a first external sealing surface. The male connector end includes an external shoulder extending outwardly relative to a longitudinal axis and a second external sealing surface adjacent the external shoulder, and external threads between the first external sealing surface and the second external sealing surface. The flush fluid connection includes a second fluid connector that has a female connector end having an elongated nose section comprising a front surface and a first internal sealing surface. The female connector end includes an internal shoulder extending inwardly relative to the longitudinal axis and a second internal sealing surface adjacent the internal shoulder, and internal threads between the first internal sealing surface and the second internal sealing surface.

20 Claims, 9 Drawing Sheets

(56) References Cited

U.S. PATENT DOCUMENTS

| | | | |
|---|---|---|---|
| 7,494,159 B2* | 2/2009 | Sugino | E21B 17/042 285/333 |
| 7,506,900 B2* | 3/2009 | Carcagno | F16L 15/004 285/333 |
| 7,513,537 B2* | 4/2009 | Mosing | F16L 37/2445 285/401 |
| 7,614,667 B2 | 11/2009 | Hignett | |
| 8,070,191 B2* | 12/2011 | Fujii | F16L 15/001 285/333 |
| 8,267,436 B2* | 9/2012 | Church | E21B 17/042 285/334 |
| 8,985,640 B2* | 3/2015 | Leng | E21B 17/042 285/333 |
| 9,239,122 B2* | 1/2016 | Pollack | F16L 15/004 |
| 2004/0036286 A1* | 2/2004 | Della Pina | F16L 15/004 285/333 |
| 2004/0262919 A1 | 12/2004 | Dutilleul et al. | |
| 2005/0087985 A1* | 4/2005 | Mosing | F16L 37/2445 285/391 |
| 2006/0061098 A1* | 3/2006 | Hovem | E21B 17/042 285/333 |
| 2007/0029797 A1* | 2/2007 | Santi | E21B 17/042 285/333 |
| 2007/0236015 A1* | 10/2007 | Sugino | E21B 17/042 285/334 |
| 2008/0265569 A1* | 10/2008 | Carcagno | F16L 15/004 285/220 |
| 2011/0012349 A1* | 1/2011 | Church | E21B 17/042 285/334 |
| 2011/0101684 A1* | 5/2011 | Leng | F16L 15/004 285/332.2 |
| 2011/0133449 A1* | 6/2011 | Mazzaferro | F16L 15/004 285/333 |
| 2011/0227338 A1* | 9/2011 | Pollack | F16L 15/004 285/355 |
| 2012/0098256 A1* | 4/2012 | Schulte | F16L 15/06 285/333 |
| 2012/0298249 A1* | 11/2012 | Banker | E21B 17/042 138/177 |
| 2013/0020072 A1* | 1/2013 | Leng | E21B 17/042 166/242.6 |
| 2014/0300104 A1* | 10/2014 | Pollack | F16L 15/00 285/333 |

* cited by examiner

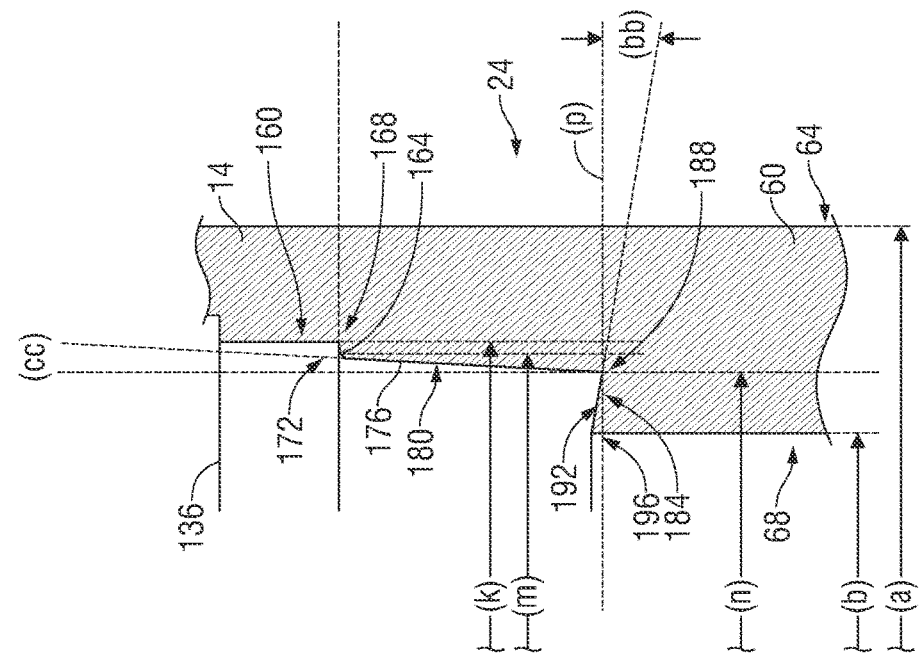
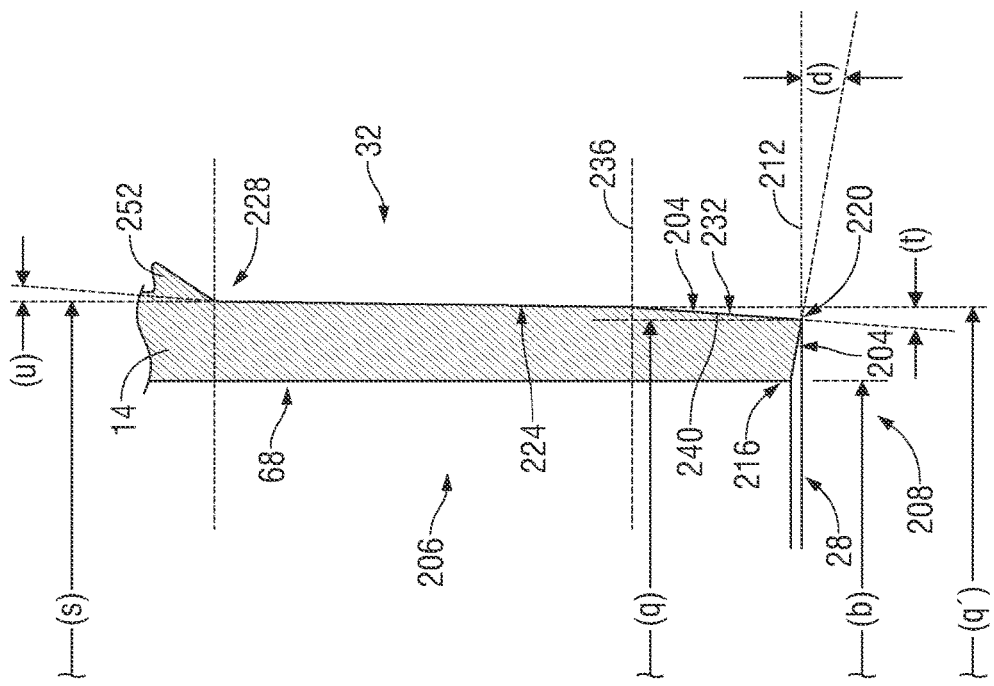

FLUSH THREADED CONNECTION AND METHOD OF FORMING AND USING THE FLUSH THREADED CONNECTION

FIELD

The present disclosure generally relates to a threaded connection between tubular segments, threaded connections for a tubular conduit, and methods of forming threaded connections. More specifically, the present disclosure relates to a flush threaded connection between a first fluid connector having a male end and a second fluid connector having a female end, with the male and female ends comprising parallel threads for forming the flush threaded connection.

BACKGROUND

Threaded connections between tubular segments or joints of tubular conduit or pipe, such as oilfield tubulars and similar conduits, can be formed by providing a large torque to complimentary male and female threaded members, at the ends thereof, to engage the male and female threaded members in mating relationship. The magnitude of the force used to form the connection can vary depending on the dimensions and/or tolerance of the members. During use, conduits, which are used to contain fluid flow, must be connected using a torque sufficient to fully or substantially engage the threads to form a fluid-tight seal therebetween. Tubular conduits that must withstand significant fluid pressures, such as drill pipe and other oilfield tubular conduit, require a significant torque (up to 50,000 foot-pounds, or more) to form a fluid-tight seal. Even when properly torqued, multiple, redundant seals are often required to ensure fluid-tight integrity under anticipated fluid pressures without permitting damage to the members.

Application of significant torque to tubular members can cause galling, stripping, and/or cross-threading of the threads. Galling and similar destructive deformation can create difficulty when attempting to engage or disengage a threaded connection, and can prevent reuse of the deformed tubular members. Typically, to reduce and/or prevent galling, tubular threads must be treated, such as through application of a coating of tin, zinc, or other metals and/or alloys, or by "sugar blasting" the threads with fine grains of sand. When a threaded connection is placed under a significant lateral force, bending force or combination of such forces, such as when used within a directional borehole, one or more of the threads can become disengaged, compromising the integrity of the connection and seal.

A need exists for a threaded connection between threaded tubulars that can be torqued without galling or otherwise damaging the threads to enable a stronger connection and the reuse or re-engagement of the threaded tubulars.

Another need exists for a fluid connection assembly comprising a first fluid connector having a male end and second fluid connector having a female end, wherein the male and female ends, each, comprise parallel threads for threadable engagement to form a flush threaded connection, which provides greater efficiency in the handling and controlling of tensile strength.

A further need exists for a threaded connection between a first fluid connector having a male end with parallel threads and a second fluid connector having a female end with parallel threads, with both ends comprising symmetrical shoulders and corresponding faces, which can be joined and maintained in contact to form a metal-to-metal seal as the connection experiences tension or is bent during downwell operations.

SUMMARY

The present embodiments provide a flush threaded connection between tubular conduit, which can be suitable to contain fluid under high pressure for applications, such as oilfield down-hole piping and drilling. Particularly, the embodiments of the present invention provide a fluid connection assembly comprising a first fluid connector having a male connector end and a second fluid connector having a female connector end, wherein each connector comprises parallel threads for threadable engagement to form a flush threaded connection.

The flush threaded connection can be suitable to contain fluid under high pressure for use in downhole applications, such as oilfield down-hole piping and drilling operations, wherein the fluid connector assembly, and particularly the flush threaded connection, is stable and maintains a fluid-tight integrity at high pressures, including under stresses such as, stresses created by lateral or bending loads that occur when the fluid connector assembly is curved, for example, to fit through curving or non-vertical portions of a borehole (e.g., directional borehole).

It will be understood that as used herein, "directional boreholes" refers to non-vertical wells or curved wells, which are typically drilled for oil and gas production to draw hydrocarbons from one or multiple generally horizontal feeder boreholes that depart, spread or transition from a substantially vertical section that extends from a subsurface formation to the terrain surface. Directional boreholes can be used, for example, when hydraulic fracturing is employed to produce hydrocarbons from a formation. It will be understood that directional boreholes can also refer to, for example, boreholes formed by directional drilling, including horizontal drilling, for the extraction of hydrocarbons, gas and/or water, in addition to other uses, such as the installation of utility infrastructure and drilling to target coal beds for methane production.

Embodiments of the present invention include a fluid connector assembly comprising a first fluid connector, which can comprise a generally cylindrical shape and a bore extending therethrough, along a longitudinal axis thereof. The first fluid connector can comprise a male connector end, having an inside diameter and an outside diameter, wherein the male connector end can comprise a nose section, an external shoulder extending outwardly relative to the longitudinal axis of the first fluid connector, and a second external surface that is adjacent to the external shoulder. The nose section of the first fluid connector can comprise a front sealing surface and a first external sealing surface, and the first fluid connector can include external threads, located between the first external sealing surface and the second external surface, for engaging a second fluid connector.

The embodiments of the fluid connector assembly further comprise a second fluid connector, which can comprise a generally cylindrical shape and a bore extending therethrough, along a longitudinal axis thereof. The second fluid connector can comprise a female connector end, having an inside diameter and an outside diameter, and the female connector end can comprise a nose section, an internal shoulder that can extend inwardly relative to the longitudinal axis of the second fluid connector, and a second internal sealing surface that can be adjacent the internal shoulder. The nose section of the second fluid connector can comprise a front sealing surface and a first internal sealing surface, and the second fluid connector can comprise internal threads, located between the first internal sealing surface and the second internal sealing surface, for engaging the first or another fluid connector.

The embodiments of the fluid connector assembly can include the threadable engagement of the external threads of the male connector end with the internal threads of the female connector end. The external threads of the male connector end can comprise parallel threads and the internal threads of the female connector end can comprise parallel threads for forming a flush joint threaded connection.

In an embodiment, the inside diameter of the male connector end can be essentially the same as the inside diameter of the female connector end, and the outside diameter of the male connector end can be essentially the same as the outside diameter of the female connector, such that engagement between the male connector end of the first fluid connector and the female connector end of the second fluid connector joins the bore of the first connector with the bore of the second connector to define a flowpath for communicating a medium.

The embodiments of the present invention can include the forming of at least four metal-to-metal seals for maintaining contact between the first fluid connector and the second fluid connector. For example, the front sealing surface of the male connector end can contact the internal shoulder of the female connector end to form a metal-to-metal seal therebetween, and the front sealing surface of the female connector end can contact the external shoulder of the male connector end to form a metal-to-metal seal therebetween. In addition, other metal-to-metal seals can be formed when the first external sealing surface of the male connector end contacts the second internal sealing surface of the female connector, and when the first internal sealing surface of the female connector end contacts the second external sealing surface of the male connector, each forming such metal-to-metal seals therebetween.

In an embodiment of the fluid connector assembly, the length of the nose section of the male connector end can be essentially the same as the length of the nose section of the female connector end. Embodiments of the fluid connector assembly can include the axial expansion of the nose section of the male connector end for maintaining contact with the female connector end when the first fluid connector and the second fluid connector are in tension with respect to each other. Embodiments can also include the axial expansion of the nose section of the female connector end to maintain contact with the male connector end when the first fluid connector and the second fluid connector are in tension with respect to each other.

In an embodiment of the fluid connector assembly, a projected annular area of the external shoulder of the male connector end can be essentially the same as a projected annular area of the internal shoulder of the female connector end. In the same or another embodiment, a projected annular area of the external shoulder and the second external sealing surface can be essentially the same as a projected annular area of the internal shoulder and the second internal sealing surface.

In an embodiment of the fluid connector assembly, the cross-sectional area of the nose section of the male connector end, along a plane perpendicular to the longitudinal axis of the first fluid connector, can be essentially the same as a cross-sectional area of the nose section of the female connector end, along a plane perpendicular to the longitudinal axis of the second fluid connector.

Embodiments of the fluid connector assembly can include an external shoulder of the male connector end that extends diagonally with respect to the longitudinal axis of the first fluid connector. In this embodiment, the external shoulder can extend outwardly with respect to the longitudinal axis of the first fluid connector, in the direction of the external threads. In this or another embodiment, the internal shoulder of the female connector end can extend diagonally with respect to the longitudinal axis of the second fluid connector, and the internal shoulder can extend inwardly with respect to the longitudinal axis of the second fluid connector in the direction of the internal threads.

In an embodiment, the fluid connector assembly can include a male connector end having a nose section that can be axially compressed against the internal shoulder of the female connector end to elastically deform the nose section of the male connector end along the longitudinal axis of the first fluid connector, and the female connector end can include a nose section that can be axially compressed against the external shoulder of the male connector end to elastically deform the nose section of the female connector end along the longitudinal axis of the second fluid connector. In this or other embodiments, the elongated nose section of the female connector end can contact the external shoulder of the male connector end, when the first fluid connector and the second fluid connector are in tension with respect to each other, and the elongated nose section of the male connector end can contact the internal shoulder of the female connector end when the first fluid connector and the second fluid connector are in tension with respect to each other.

Embodiments of the present invention can include a method that is usable for forming a fluid connection, in which the method includes the steps of providing a first fluid connector having a generally cylindrical shape with a bore extending therethrough along a longitudinal axis thereof, and providing a second fluid connector having a generally cylindrical shape with a bore extending therethrough along a longitudinal axis thereof. The first fluid connector can include a male connector end that can comprise an elongated nose section, which can comprise a front surface and a first external surface; an external shoulder, which can extend outwardly relative to the longitudinal axis and a second external surface adjacent the external shoulder; and external threads located between the first external surface and the second external surface. The second fluid connector can include a female connector end that can comprise an elongated nose section, which can comprise a front surface and a first internal surface; an internal shoulder, which can extend inwardly relative to the longitudinal axis and a second internal surface adjacent the internal shoulder; and internal threads located between the first internal surface and the second internal surface.

The steps of the method for forming a fluid connection can include threadably engaging the external threads with the internal threads, contacting the front surface of the male connector end with the internal shoulder of the female connector end, thereby forming a metal-to-metal fluid seal therebetween; and contacting the front surface of the female connector end with the external shoulder of the female connector end, thereby forming a metal-to-metal fluid seal therebetween.

In an embodiment, the steps of the method for forming a fluid connection can include axially compressing the elongated nose section of the male connector end against the internal shoulder of the female connector end to elastically deform the elongated nose section of the male connector end along the longitudinal axis of the first fluid connector. In addition, the embodiments of the method can include axially compressing the elongated nose section of the female connector end against the external shoulder of the male connector end to elastically deform the elongated nose section of the female connector end along the longitudinal axis of the second fluid connector.

An embodiment of the method for forming a fluid connection can include axially expanding the elongated nose section of the female connector end to maintain contact with the male connector end, particularly when the first fluid connector and the second fluid connector are in tension with respect to each other, and axially expanding the elongated nose section of the male connector end to maintain contact with the female connector end when the first fluid connector and the second fluid connector are in tension with respect to each other.

The embodiments of the method for forming a fluid connection can further include the step of allowing the elongated nose section of the male connector end to expand along the longitudinal axis of the first fluid connector, when an adjacent wall of the female connector end is in tension, to maintain contact between the front surface of the male connector end and the internal shoulder of the female connector end, thereby maintaining the metal-to-metal fluid seal therebetween. In addition, the method can include the step of allowing the elongated nose section of the female connector end to expand along the longitudinal axis of the second fluid connector, when an adjacent wall of the male connector end is in tension, to maintain contact between the front surface of the female connector end and the external shoulder of the male connector end, thereby maintaining the metal-to-metal fluid seal therebetween.

In an embodiment, the method for forming a fluid connection can include the steps of wedging the elongated nose section of the male connector end against the internal shoulder of the female connector end, thereby maintaining the front surface of the male connector end against the internal shoulder during the axial compression of the elongated nose section of the male connector, and wedging the elongated nose section of the female connector end against the external shoulder of the male connector end, thereby maintaining the front surface of the female connector end against the external shoulder during the axial compression of the elongated nose section of the female connector.

In an embodiment, the method for forming a fluid connection can further include the step of providing the external shoulder of the male connector end with a projected annular area, which can be essentially the same as a projected annular area of the internal shoulder of the female connector end, to distribute stress essentially equally between the external shoulder and the internal shoulder. In this or another embodiment, the method can include the step of providing the external shoulder and the second external sealing surface of the male connector end with a projected annular area that is essentially the same as a projected annular area of the internal shoulder and the second internal surface of the female connector end.

In an embodiment, the steps of the method for forming a fluid connection further comprise providing the elongated nose section of the male connector end with a cross-sectional area along a first plane, which is perpendicular to the longitudinal axis of the first fluid connector, that is essentially the same as a cross-sectional area of the elongated nose section of the female connector end along a second plane, which is perpendicular to the longitudinal axis of the second fluid connector, to essentially equalize axial stress in the elongated nose section of the male connector end, along the first plane, with the axial stress in the elongated nose section of the female connector end, along the second plane.

The steps of the method for forming a fluid connection can further comprise providing the male connector end with essentially the same cross-sectional areas as portions, which can be equivalent or corresponding portions, of the female connector end along a plane extending perpendicularly with respect to the longitudinal axis of the first fluid connector and the second fluid connector, respectively, thereby equalizing axial stress in the male connector end with the axial stress in the portions (e.g., equivalent or corresponding portions) of the female connector end.

In an embodiment, the present invention can include a method of forming a fluid connection, in which the method comprises the steps of providing a first fluid connector that can include a male end having a generally cylindrical shape, with a bore extending therethrough along a longitudinal axis thereof, and providing a second fluid connector that can comprise a female end having a generally cylindrical shape, with a bore extending therethrough along a longitudinal axis thereof. In this embodiment, the male end can comprise a nose section, which can include a front surface and a first outer surface, a second outer surface and an external shoulder extending from the second outer surface, and external threads located between the first outer surface and the second outer surface. The female end can comprise a nose section having a front surface and a first inner surface, a second inner surface and an internal shoulder extending from the second inner surface, and external threads between the first inner surface and the second inner surface.

Embodiments of the method can include the steps of compressing the nose section of the male end against the internal shoulder of the female end to form a first metal-to-metal seal therebetween, and to elastically strain the nose section of the male end along the longitudinal axis of the male end. In addition, the steps of the method can include compressing the nose section of the female end against the external shoulder of the male end to form a second metal-to-metal seal therebetween, and to elastically strain the nose section of the female end along the longitudinal axis of the female end. The steps of the method can further include expanding the nose section of the male end along the longitudinal axis thereof, when the adjacent wall of the female end is in tension, to maintain compression against the internal shoulder of the female end and to maintain the first metal-to-metal seal. The steps of the method can include expanding the nose section of the female end along the longitudinal axis thereof, when the adjacent wall of the male end is in tension, to maintain compression against the external shoulder of the male end and to maintain the second metal-to-metal seal.

In an embodiment of the method for forming a fluid connection, the portions of the male end, along the longitudinal axis, can have essentially the same cross-sectional area as portions (e.g., equivalent or corresponding portions) of the female end, along the longitudinal axis, thereby equalizing axial stress in portions of the male end along the longitudinal axis with the axial stress in the portions (e.g., equivalent or corresponding portions) of the female connector end along the longitudinal axis.

In an embodiment, the steps of the method can include providing the external shoulder of the male end with a projected annular area that is essentially the same as a projected annular area of the internal shoulder of the female end to distribute stress essentially equally between the external shoulder and the internal shoulder.

In an embodiment of the method, the steps can further comprise providing the nose section of the male end with a cross-sectional area along a first plane, which is perpendicular to the longitudinal axis of the male end, that is essentially the same as a cross-sectional area of the nose section of the female end, along a second plane perpendicular to the longitudinal axis of the female end, for essentially equalizing the axial stress in the nose section of the male end, along the first plane, with the axial stress in the nose section of the female end, along the second plane.

Embodiments described herein further provide connections and/or couplings that can be torqued without galling and/or otherwise damaging threads or other portions of the members. Embodiments described herein can also be plastically and/or elastically deformed to enhance the sealing relationship between adjacent members, while preventing deformation of other portions of the members.

BRIEF DESCRIPTION OF THE DRAWINGS

In the detailed description of various embodiments of the present invention presented below, reference is made to the accompanying drawings, in which:

FIG. 9 depicts an enlarged partial view of a male member of a tubular conduit usable within the scope of the present disclosure and indicated by numeral 9 in FIG. 3.

FIG. 10 depicts an enlarged partial view of a female member of a tubular conduit usable within the scope of the present disclosure and indicated by numeral 10 in FIG. 2.

Figure 1:
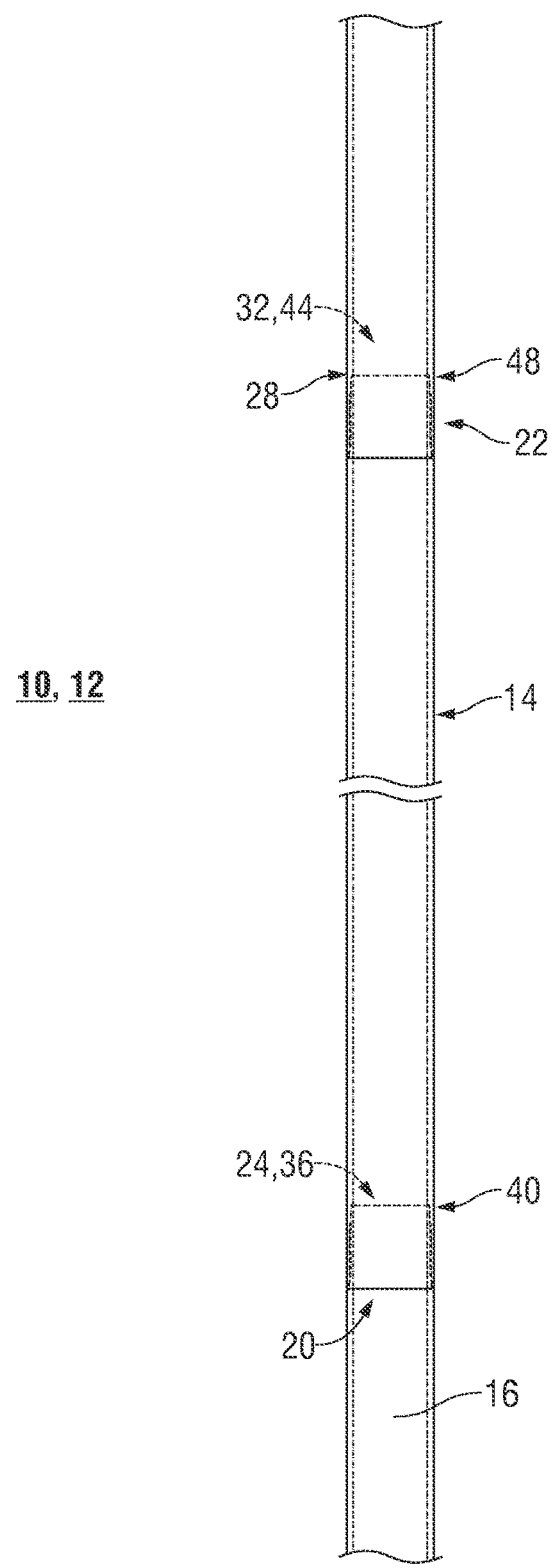
FIG. 1 depicts a string of tubular conduit formed of a plurality of joints of tubular conduit, usable within the scope of the present disclosure.

Embodiments of the present invention are described below with reference to the listed Figures.

DETAILED DESCRIPTION OF THE EMBODIMENTS

Before describing selected embodiments of the present invention in detail, it is to be understood that the present invention is not limited to the particular embodiments described herein. The disclosure and description of the invention is illustrative and explanatory of one or more presently preferred embodiments of the invention and variations thereof, and it will be appreciated by those skilled in the art that various changes in the design, organization, order of operation, means of operation, equipment structures and location, methodology, and use of mechanical equivalents, as well as in the details of the illustrated construction or combinations of features of the various elements, may be made without departing from the spirit of the invention.

As well, the drawings are intended to describe the concepts of the invention so that the presently preferred embodiments of the invention will be plainly disclosed to one of skill in the art, but are not intended to be manufacturing level drawings or renditions of final products and may include simplified conceptual views as desired for easier and quicker understanding or explanation of the invention. As well, the relative size and arrangement of the members may differ from that shown and still operate within the spirit of the invention as described throughout the present application.

Moreover, it will be understood that various directions such as "upper", "lower", "bottom", "top", "left", "right", and so forth are made only with respect to explanation in conjunction with the drawings, and that the members may be oriented differently, for instance, during transportation and manufacturing as well as operation. Because many varying and different embodiments may be made within the scope of the inventive concept(s) herein taught, and because many modifications may be made in the embodiments described herein, it is to be understood that the details herein are to be interpreted as illustrative and non-limiting.

The present invention generally relates methods usable for forming a fluid connection and a fluid connection assembly that comprises a first fluid connector having a male connector end and a second fluid connector having a female connector end, wherein each connector comprises parallel threads for threadable engagement to form a flush threaded connection. The fluid connector assembly can include a first fluid connector, which comprises a male connector end or male end having external threads and a second fluid connector, which comprises a female connector end or female end having internal threads, with both fluid connectors comprising a generally cylindrical shape and a bore extending therethrough, along a longitudinal axis thereof.

The embodiments of the fluid connector assembly can include the threadable engagement of the external threads of the male connector end with the internal threads of the female connector end. The external threads of the male connector end can comprise parallel threads and the internal threads of the female connector end can comprise parallel threads for forming a flush joint threaded connection. In an embodiment, the inside diameter of the male connector end can be essentially the same as the inside diameter of the female connector end, and the outside diameter of the male connector end can be essentially the same as the outside diameter of the female connector, such that engagement between the male connector end of the first fluid connector and the female connector end of the second fluid connector joins the bore of the first connector with the bore of the second connector to define a flowpath for communicating a medium.

The embodiments of the present invention can include the forming of at least four metal-to-metal seals for maintaining contact between the first fluid connector and the second fluid connector. For example, the front sealing surface of the male connector end can contact the internal shoulder of the female connector end to form a metal-to-metal seal therebetween, and the front sealing surface of the female connector end can contact the external shoulder of the male connector end to form a metal-to-metal seal therebetween. In addition, other metal-to-metal seals can be formed when the first external sealing surface of the male connector end contacts the second internal sealing surface of the female connector, and when the first internal sealing surface of the female connector end contacts the second external sealing surface of the male connector, each forming such metal-to-metal seals therebetween.

Embodiments provide threaded connections which, when formed by application of sufficient torque, remain in compression during use and are stable under stresses created by lateral or bending forces on the tubular conduit forming the threaded connection. Such lateral or bending forces can be imposed, for example, when the tubular conduit is curved to fit curved portions of a directional borehole. Embodiments provide tubular conduit including threaded connections which, when formed by application of sufficient torque, can remain in compression during use and can be preloaded to create release and defined loading in the tubular conduit. In some embodiments, tubular conduit can include threaded connections which, when formed by application of sufficient torque, can remain in compression during use and can be preloaded, wherein the preloaded stress can be maintained if an external compression or tension load is removed from the threaded connection. In some embodiments, tubular conduit can include threaded connections with reduced hoop stress. Some embodiments provide tubular conduit including threaded connections, wherein torque can be transmitted through the threaded connection without hoop stress being increased by mechanics or structure of the threaded connection.

Embodiments provide threaded connections that, when formed by application of sufficient torque, have greater mechanical efficiency and/or strength properties relative to the unaltered, wall structure of the tubular conduit that is used to form the threaded connection. In some embodiments, such mechanical efficiency and/or strength properties can be at least about seventy percent (70%) of the mechanical strength properties of the wall structure of the tubular conduit, in which the threaded connections are formed. In some embodiments, the mechanical efficiency and/or strength properties can be at least about eighty percent (80%) of the mechanical strength properties of the wall structure of the tubular conduit. in which the threaded connections are formed.

Embodiments of the present invention provide threaded connections having a configuration that can allow for radial expansion of members without causing damage or undesired deformation of the members, or hindering the fluid-tight integrity or stability of the threaded connection. In an embodiment, the threaded connection can be formed between multiple joints of tubular conduit for containing fluid under high pressure, in which the conduit can have a relatively larger internal diameter for clearance to pass materials inside the tubular conduit, and a greater volume per width and length than other tubular conduit. In an embodiment, the flush threaded connection provides an improved connection, with a flush fit both inside and outside the tubular conduit, to enable better passage of down-hole tools through the tubular conduit.

According to the embodiments of the present invention, when it is desired to disassemble the string of tubular conduit by disengaging the threaded connections thereof, reverse torque can be applied to the male and/or female member that is sufficient to break the radial seals and the axial seal(s), so that the threads can be smoothly disengaged in the absence of galling, therebetween.

Embodiments described herein thereby provide strings of tubular conduit made up of a plurality segments or joints of tubular conduit, joined by flush threaded connections having configurations of sealing surfaces being maintained in compression during use, which provide improved fluid-tight integrity and stability, particularly when the string of tubular conduit is subjected to lateral forces and/or bending forces. Embodiments provide such strings of tubular conduit having threaded connections, wherein mating threaded engagement of external and internal threads upon being assembled by application of sufficient torque to cause preloading and release, create and maintain compression forces between complementary thrust surfaces of first and second radial seals, which are located at respective opposite ends of the threaded connection. In addition, embodiments include the creating and maintaining of sealing forces between complementary axial sealing surfaces of first and second axial seals, intermediate the first and second radial seals. It will be understood that the seals so formed can be metal-to-metal seals.

FIG. 1 depicts a conduit or tubular string (10) formed of a plurality of individual tubular segments or joints (14) of tubular conduit (12), usable within the scope of the present disclosure for forming a fluid connection assembly. In the embodiment illustrated in FIG. 1, the conduit string (10) includes an elongated segment (14) of tubular conduit, which is a first fluid connector that is joined at opposite ends thereof to a first complementary segment (16) of tubular conduit and a second complementary segment (18) of tubular conduit. Each of the segments or joints (14) of tubular conduit (12), including the first complementary segment (16) and the second complementary segment (18), can be identical, as shown in FIG. 1.

As shown in FIG. 1, the segment (14) of tubular conduit that is proximate a first end (20) thereof, has a female end threaded member (24) (i.e., female connector end or female end) and, proximate a second end (28) thereof, has a male end threaded member (32) (i.e., male connector end or male end). The female end threaded member (24) of the first fluid connector (14) is configured for threadably engaging a complementary male end threaded member (36) of the first complementary joint (16) (e.g., a second fluid connector) of tubular conduit to form a respective first threaded connection (40) (for example, a fluid connection assembly) therebetween. As shown, the complementary male end threaded member (36) can be identical to the male end threaded member (32) of the first fluid connector (14).

The male end threaded member (32) of the first fluid connector (14) is configured for threadably engaging with a complementary female end threaded member (44) of the second complementary joint (18) of tubular conduit (e.g., a second fluid connector) to form a respective second threaded connection (48) (e.g., a fluid connection assembly) therebetween. It will be understood that the complementary female end threaded member (44), as shown, can be identical to the female end threaded member (24) of the first fluid connector (14).

A shown in FIG. 1, the conduit string (10) generally includes a series of identical segments or joints (14) of tubular conduit (12) that can be joined by respective threaded connections (22, 20) (e.g. a fluid connection assembly), wherein each threaded connection (22, 20) is made up of a female threaded member and complementary male threaded member, for example the fluid connection assembly formed by a threaded connection between the male end threaded member (32) of the first fluid connector (14) and the complementary female end threaded member (44) of a second fluid connector (18).

Figure 3:
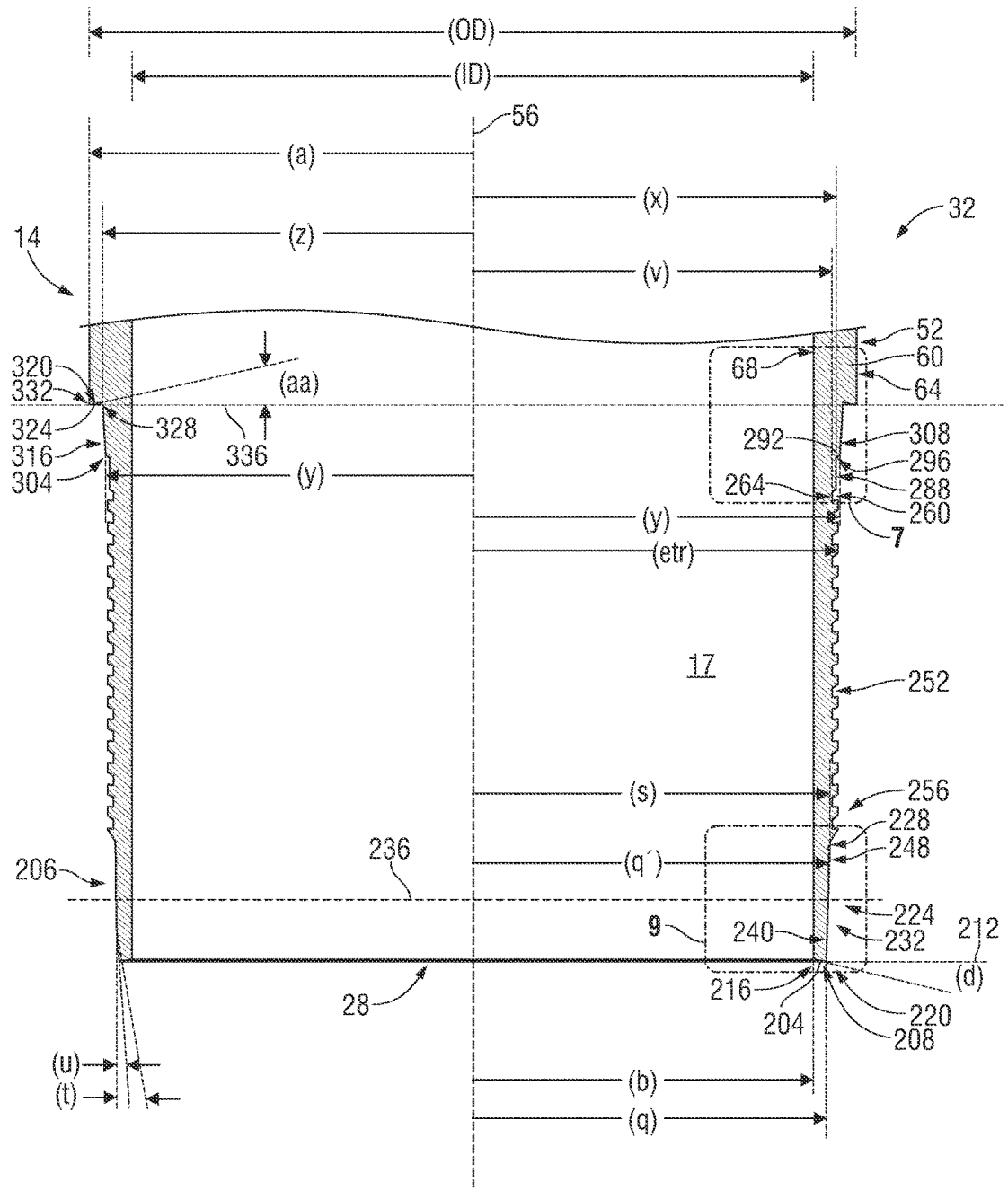
FIG. 3 depicts a cross-sectional view of a male member of a tubular conduit usable within the scope of the present disclosure.

Referring to the embodiment shown in FIG. 3, the first fluid connector (14) can comprise a male connector end or male end (32), having an inside diameter (ID) and an outside diameter (OD), wherein the male connector end (32) can comprise a nose section (206), an external shoulder (324, shown in FIGS. 3 and 7) extending outwardly relative to the longitudinal axis (56) of the first fluid connector (14), and a second external sealing surface (308) that is adjacent to the external shoulder (324). The nose section (206) of the first fluid connector (14) can comprise a front sealing surface (204) and a first external sealing surface (232), and the external threads (252) of the first fluid connector (14) can be located between the first external sealing surface (232) and the second external sealing surface (308), for engaging the second fluid connector (18).

Figure 2:
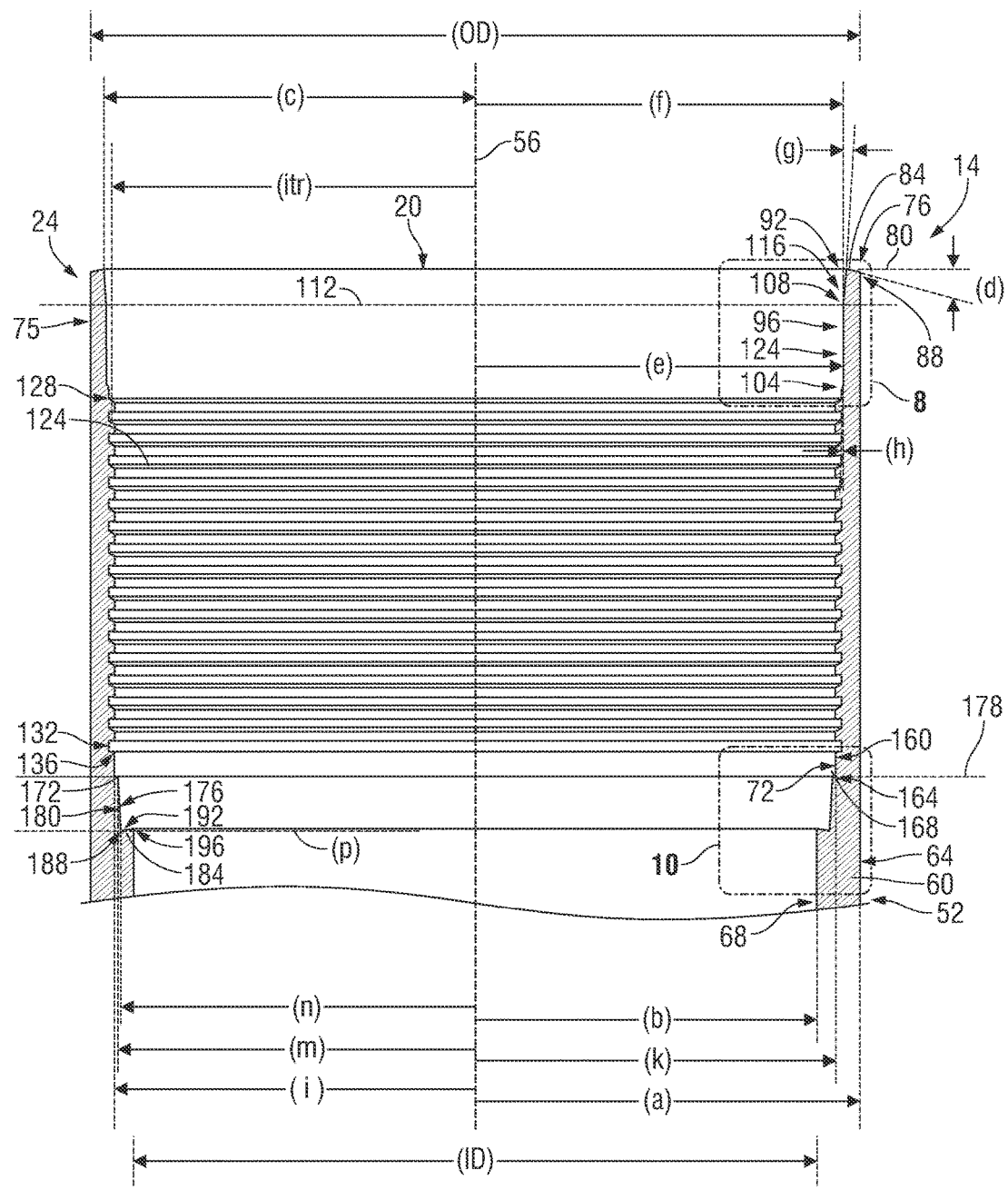
FIG. 2 depicts a cross-sectional view of a female member of a tubular conduit usable within the scope of the present disclosure.

Referring to the embodiment shown in FIG. 2, the second fluid connector (18) can comprise a female connector end or female end (44), having an inside diameter (ID) and an outside diameter (OD), and the female connector end (44) can comprise a nose section (75), an internal shoulder (192) that can extend inwardly relative to the longitudinal axis (56) of the second fluid connector (18), and a second internal sealing surface (176) that can be adjacent the internal shoulder (192). The nose section (75) of the second fluid connector (18) can comprise a front sealing surface (84) and a first internal sealing surface (108), and the internal threads (124) of the second fluid connector (18) can be located between the first internal sealing surface (108) and the second internal sealing surface (176), for engaging the first fluid connector (14) or another fluid connector.

Returning to FIG. 1, in the tubular conduit string (10), each threaded connection (20, 22) can be formed by an application of torque sufficient to fully engage radial sealing surfaces (e.g., shoulders, see FIGS. 2 & 3) and to introduce compression between the female threaded member (44) and complementary male threaded member (22), wherein the compression is maintained during use.

Figure 8:
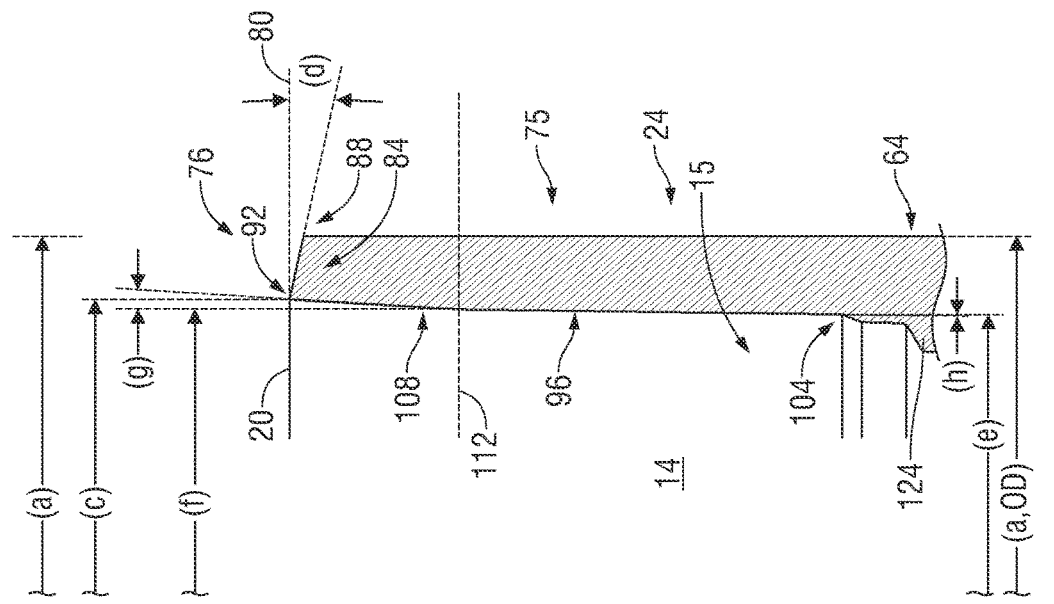
FIG. 8 depicts an enlarged partial view of a female member of a tubular conduit usable within the scope of the present disclosure and indicated by numeral 8 in FIG. 2.

FIG. 2 depicts a cross-sectional view of a female end threaded member (24) (i.e., a female connector end or female end) of a second fluid connector (13, also shown in FIG. 8), which can be, for example, a segment (14) of tubular conduit (12) (e.g., a first fluid connector), that is usable within the scope of the present disclosure. It will be understood that second fluid connector (18), as shown in FIGS. 2 and 8, comprises a generally cylindrical shape with a bore (15) extending therethrough along a longitudinal axis (56).

Referring to FIG. 2, the segment (14) of tubular conduit (12) includes an elongated, continuous tubular wall (52) extending from the first end (20) to the second end (28, shown in FIGS. 1 and 3) in spaced parallel relation to a longitudinal axis (56). Intermediate the female end threaded member (24) and male end threaded member (32, shown in FIG. 3), the tubular wall (52) comprises a native wall structure (60). The wall structure (60) can include an outer surface (64) having an outer diameter (OD) and defining an outer radius (a) relative to the longitudinal axis (56). In addition, the wall structure (60) can include an inner surface (68) that can be spaced from the outer surface (64), in parallel relation thereto. The inner surface (68) can include an inner diameter (ID) and can define an inner radius (b) relative to the longitudinal axis. The wall structure (60) can comprise a wall thickness that can be defined between the outer surface (64) and the inner surface (68). Thus, the wall thickness can be equal to the difference between the outer radius (a) and the inner radius (b).

Referring still to FIG. 2, the female end threaded member (24) can be defined in the wall structure (60), such as by machining of the wall structure (60), and the female end threaded member (24) can be treated or coated in any suitable manner. The female end threaded member (24) can include a female outer surface (72) that can be a portion of outer surface (64) of the wall structure (60). As shown in FIGS. 2 and 8, the female end threaded member (24) can comprise a nose section (75), which can include a female outer terminal end (76). As shown in FIG. 2, the outer surface (64) of the wall structure (60) can terminate at the female outer terminal end (76), in spaced relation to a female outer reference axis (80). The female outer reference axis (80) is shown perpendicular to the longitudinal axis (56), and the female outer terminal end (76) can include a continuous female outer radial sealing surface (84) (e.g., front sealing surface). The female outer radial sealing surface (84) can intersect the outer surface (64) at a respective female outer radial sealing surface outside edge (88), and the female outer radial sealing surface outside edge (88) comprises an outer radius (a).

In other embodiments (not shown), the female outer radial sealing surface outside edge (88) can be rounded and can have a radius less than the native outer radius (a). As shown in FIGS. 2 and 8, from the female outer radial sealing surface outside edge (88), the female outer radial sealing surface (84) can extend inwardly, toward the longitudinal axis (56). The female outer radial sealing surface (84) can return and terminate at a respective continuous female outer radial sealing surface inside edge (92). Particularly, the female outer radial sealing surface (84) can terminate at the respective continuous female outer radial sealing surface inside edge (92) in an intersecting relationship with a female first land (96), wherein a land is defined as a surface that extends substantially axially along an internal or external portion of the wall structure (60).

As shown in FIGS. 2 and 8, the female outer radial sealing surface inside edge (92) can comprise a female first radius (c) that is relative to the longitudinal axis (56) and is located at the female outer reference axis (80). Tracing from the female outer radial sealing surface inside edge (92) to the female outer radial sealing surface outside edge (88), the female outer radial sealing surface (84) can be inclined at a negative angle (d) relative to the female outer reference axis (80) to facilitate the female outer radial sealing surface (84) being engaged by (e.g., being wedged against) a complementary male inner radial sealing surface (324, shown in FIGS. 3, 4 and 7) of the complementary male end threaded member (32, shown in FIG. 4) of a second fluid connector (i.e., first complementary joint (16) of tubular conduit). It will be understood that the female outer radial sealing surface (84) (e.g., front sealing surface) has a respective projected annular area, defined along a reference axis extending perpendicular to the longitudinal axis (56), and that the projected annular area can be defined as the area between the outer radius (a) and the female first radius (c).

Referring again to FIGS. 2 and 8, the female first land (96) can be disposed in a spaced opposed relationship to the outer surface (64). As shown, the female first land (96) can intersect the female outer radial sealing surface inside edge (92). At the female outer radial sealing surface inside edge (92), the female first land (96) has the female first radius (c, as shown in FIG. 2). The female first land (96) can extend from the female outer radial sealing surface inside edge (92) to a continuous female first thread transition boundary (104), which is spaced therefrom in the longitudinal direction. At the female first thread transition boundary (104), the female first land (96) has a respective female second radius (e, as shown in FIG. 2), which is relative to the longitudinal axis (56, as shown in FIG. 2). As shown in the Figures, from the female first radius (c) at the female outer radial sealing surface inner edge (92) to the female second radius (e) at the female first thread transition boundary (104), the female first land (96) tapers inward toward the longitudinal axis (56).

As shown in FIGS. 2 and 8, the female first land (96) can include a continuous female first axial sealing surface (108) (e.g., first internal sealing surface) that is intermediate to the female outer radial sealing surface inner edge (92) and the female first thread transition boundary (104). As shown, the continuous female first axial sealing surface (108) can extend in circumferential relationship to the longitudinal axis (56). It will be understood that female first axial sealing surface (108) (e.g. first internal sealing surface) at a female first seal transition axis (112) has a respective first internal seal radius (f), shown in FIG. 8.

Referring to FIG. 8, the first internal seal radius (f) can vary along the longitudinal direction, having a value between female first radius (c) and female second radius (e). At the female outer radial sealing surface inside edge (92), the female outer radial sealing surface (108) (e.g. first internal sealing surface) can have the female first radius (c). At the first internal seal transition axis (112), the female outer radial sealing surface (108) (e.g. first internal sealing surface) can have a first internal seal radius (f). It will be understood that the female outer radial sealing surface (108) (e.g. first internal sealing surface) can have a respective projected annular area defined along a reference axis (80) extending perpendicular to the longitudinal axis (56), and that the projected annular area can be defined as the area between the female first radius (c) and first internal seal radius (f).

As shown, in FIGS. 2 and 8, the female first axial sealing surface (108) can be defined at a female first seal transition axis (112), between a female first land outer segment (116) having a first taper angle (g) relative to the longitudinal axis (56), and a female first land inner segment (124) having a second taper angle (h). The female first land outer segment (116) can extend from the female outer radial sealing surface inside edge (92) to the female first seal transition axis (112). The female first land inner segment (124) can extend from the female first thread transition boundary (104) to the female first seal transition axis (112). In an embodiment as shown in FIGS. 2 and 8, the female first axial sealing surface (108) can comprise a width extending from the female first seal transition axis (112) to the female outer radial sealing surface inside edge (92). In other embodiments, that width of the female first axial sealing surface (108) can differ. In the embodiment shown in FIGS. 2 and 8, the first taper angle (g) exceeds the second taper angle (h); however, in other embodiments (not shown), the first taper angle (g) may be equal to the second taper angle (h). The female first axial sealing surface (108), as shown in FIGS. 2 and 8, can be located to mate with a complementary male second axial sealing surface (308 shown in FIGS. 3, 4 and 7) in sealing engagement therewith.

Referring to FIG. 2, the female threaded member (24) includes internal threads (124) formed in the wall structure (60) in spaced-opposed relationship to the outer surface (64). The internal threads (124) can be located between the first internal sealing surface and a second internal sealing surface, which is further described below. The internal threads (124) can have a thread entry point (128) that can be proximate the female first thread transition boundary (104), and the internal threads (124) can have a thread pullout (132) that can be proximate a female second thread transition boundary (136). The female second thread transition boundary (136) can be spaced from the female first thread transition boundary (104), which can have a female second radius (e). The female second thread transition boundary (136) can have a respective female third radius (i), which is relative to the longitudinal axis (56). From the thread entry point (128) to the thread pullout (132), the internal threads (124) can have a constant internal thread radius (itr). Having the constant female thread radius (itr), the internal threads (124) are parallel to the longitudinal axis (56). It will be understood that, in other embodiments (not shown), the internal threads (124) may contain minor portions that comprise a tapered thread configuration or that taper to an incidental or negligible extent.

Figure 5:
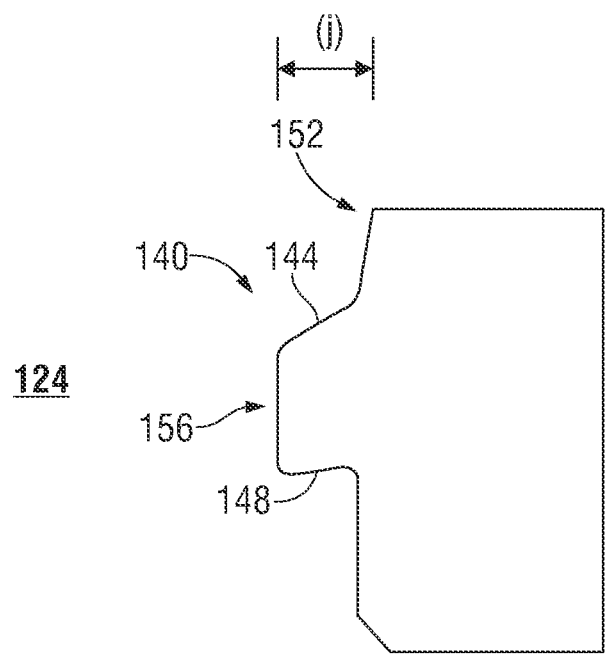
FIG. 5 depicts a diagrammatic view of an embodiment of threads of the connection of FIG. 4.

Referring to FIG. 5, the internal threads (124) can have a buttress thread form (140). In an embodiment as shown in FIG. 5, the internal threads (124) can have a buttress thread form (140) with an inclined forward face (144) and a negatively inclined rear face (148). In embodiments, the forward face (144) may be inclined, for example, about thirty degrees relative to a perpendicular axis. In embodiments, the rear face (148) may be negatively inclined, for example, about nine degrees. The internal threads (124) can have a suitable pitch based on application and/or size of the tubular segment or joint. The internal threads (124) can have a root (152) and a top (156) that can be spaced apart from the root (152). The threads (124) can have a thread height (j), from top (156) to root (152). It will be understood that the internal threads (124), having buttress thread form (140), can have a larger thread width to thread height (j) ratio, allowing the tubular segment or joint to maintain sufficient wall thickness for enabling a larger axial load bearing capacity, as compared to other tubular segments or joints having a smaller thread width to thread height ratio.

Referring again to FIG. 2, the female end threaded member (24) has a continuous female second land (160) formed in the wall structure (60), proximate the female second thread transition boundary (136). The female second land (160) can intersect the female second thread transition boundary (136) and can extend in the longitudinal direction relative to the longitudinal axis (56). The female second land (160) can have a respective female fourth radius (k) relative thereto, and the female fourth radius (k) can be equal to the female third radius (i). In an embodiment, the female second land (160) may be formed by tool clearance incidental to forming the internal threads (124).

As shown in FIGS. 2 and 10, the female second land (160) can extend in the longitudinal direction from the female second thread transition boundary (136) to a female inner sealing shoulder (164), spaced therefrom. The female inner sealing shoulder (164) can intersect the female second land (160) at a continuous female inner shoulder outside corner (168). The female inner sealing shoulder (164) can extend inward and relative to the longitudinal axis (56), from the female inner shoulder outside corner (168) to a continuous female inner shoulder inside edge (172). As shown, the female inner shoulder inside edge (172) has a respective female fifth radius (m). It will be understood that the female inner shoulder inside edge (172) defines a continuous female second axial sealing surface (176), and the female second axial sealing surface (176) can extend in circumferential relationship to the longitudinal axis (56), along the female second axial sealing surface axis (178). The female second axial sealing surface (176) can comprise a width that extends from the female inner sealing shoulder inside edge (172) to a female inner radial sealing surface outside corner (188). The radius of the female second axial sealing surface (176) can vary along the longitudinal direction, having a value between the female fifth radius (m) and the female sixth radius (n).

Referring to FIGS. 2 and 10, the female end threaded member (24) can comprise a continuous female third land (180) that can be formed in the wall structure (60), in an intersecting relationship with the female inner shoulder inside edge (172). As shown, the continuous female second inner axial sealing surface (176) (e.g., second internal sealing surface) can be defined at the intersection of the female third land (180) and the female inner shoulder inside edge (172). In the embodiment shown in FIG. 2, the female third land (180) can terminate at the female inner shoulder inside edge (172), and the female third land (180) can be spaced inward, from the female second land (160) in the radial direction relative to the longitudinal axis (56).

Referring to FIGS. 2 and 10, at the female inner shoulder inside edge (172), the female third land (180) can have a respective female fifth radius (m) that is relative to the longitudinal axis (56), and the female fifth radius (m) can be less than the female fourth radius (k). The female third land (180) can extend in the longitudinal direction, from the female inner shoulder inside edge (172) to a female inner terminal end (184). The female third land (180) can intersect and terminate at the female inner terminal end (184) and particularly at a female inner radial sealing surface outside corner (188) thereof. The female inner terminal end (184) can have a continuous female inner radial sealing surface (192) (e.g., internal shoulder) that can intersect the female third land (180) at the female inner radial sealing surface outside corner (188). The female third land (180), at the female inner radial sealing surface outside corner (188), can have a female sixth radius (n) relative to the longitudinal axis (56). The female fifth radius (m) can exceed the female sixth radius (n). From the female inner shoulder inside edge (172) to the female inner radial sealing surface outside corner (188), the female third land (180) can taper in toward the longitudinal axis (56). The female second axial sealing surface (176) (e.g., second internal sealing surface) can comprise a width that extends from the female inner sealing shoulder inside edge (172) to the female inner radial sealing surface outside corner (188). The radius of the female second axial sealing surface (176) can vary along the longitudinal direction, having a value between female fifth radius (m) and female sixth radius (n).

The female second axial sealing surface (176) (e.g., second internal sealing surface) can taper outward at a respective taper angle (cc) (shown in FIG. 10) relative to the female sixth radius (n). Particularly, in the embodiment illustrated in FIG. 10, the second internal sealing surface can taper outward relative to female sixth radius (n) at the female inner radial sealing surface outside corner (188) to the female inner shoulder inside edge (172) at taper angle (cc). Referring to FIGS. 9 and 10, the taper angle ((cc), as shown in FIG. 10) can be slightly less than a corresponding male first taper angle ((t), as shown in FIG. 9) of the male first axial sealing surface (232) (e.g., first external sealing surface) of the corresponding male end threaded member (32), to provide sealing interference between the female second axial sealing surface (176, shown in FIG. 10) and male first axial sealing surface (232, shown in FIG. 9). It will be understood that the taper angle ((cc), as shown in FIG. 10) can differ from corresponding male first taper angle ((t), as shown in FIG. 9) by about one degree, for example. As depicted, the female second axial sealing surface (176) (e.g., second internal sealing surface, shown in FIG. 10) can have a respective projected annular area that can be defined along an inner reference axis ((p), as shown in FIG. 10) extending perpendicular to the longitudinal axis (56), and the projected annular area can be defined as the area between the female fifth radius (m) and female sixth radius (n), as shown in FIGS. 2 and 10.

As shown, from the female inner radial sealing surface outside corner (188), the female inner radial sealing surface (192) (e.g. internal shoulder) can extend inward, in the radial direction relative to the longitudinal axis (56) and can return to a female inner radial sealing surface inside edge (196). Thus, the internal shoulder can be adjacent to the second internal sealing surface (176) and can extend inwardly relative to the longitudinal axis (56). The female inner radial sealing surface (192), at the female inner radial sealing surface inside edge (196), can intersect and terminate at the inner surface (68) of the wall structure (60).

As shown in FIG. 10, the female inner radial sealing surface inside edge (196) can have an inner radius (b), and the female inner radial sealing surface outside corner (188) can be located at a female inner reference axis (p), which is shown in FIG. 2 as perpendicular to the longitudinal axis (56). Referring to FIG. 10, from the female inner radial sealing surface outside corner (188) to the female inner radial sealing surface inside edge (196), the female inner radial sealing surface (192) can be inclined at a negative angle (bb) relative to the female inner reference axis (p) to facilitate the female inner radial sealing surface (192) engaging with a complementary male inner radial sealing surface (204, shown in FIGS. 3 and 4) of the complementary male end threaded member (32) of the first complementary joint (16) of tubular conduit. Thus, the internal shoulder can extend diagonally, with respect to the longitudinal axis (56) of the second fluid connector (18), and can extend inwardly with respect to the longitudinal axis (56) of the second fluid connector (18) in the direction of the internal threads (124). The female inner radial sealing surface (192) (e.g. internal shoulder) can have a respective projected annular area that can be defined along a reference axis extending perpendicular to the longitudinal axis (56), and the projected annular area can be defined as the area between the inner radius (b) and the female sixth radius (n).

Referring to FIGS. 3, 4, 7, and 9, the Figures show a first fluid connector (14) that can be, as illustrated, a segment or joint (14) of tubular conduit (12), which includes at the second end (28) thereof, the male end threaded member (32) (e.g., male connector end or male end). The first fluid connector (14) can have a generally cylindrical shape, with a bore (17) extending therethrough along a longitudinal axis (56). The male end threaded member (32) can be defined in the wall structure (60) and can comprise an inner surface (68). As shown in Figures, the male end threaded member (32) can include a male nose section (206), including a male outer terminal end (208). The length of the nose section (206) of the male end threaded member (32) can be essentially the same as the length of the nose section (75) of the female end threaded member (44) (e.g. female connector end or female end, as shown in FIG. 2).

Referring to the embodiment shown in FIG. 3, the length of the male nose section (206) can be determined, for example, as the length between the respective male outer terminal end (208) and external threads (252). Referring to the embodiment shown in FIG. 2, the length of the nose section (75) of the female end threaded member (44) (e.g., female connector end or female end) can be determined, for example, as the length between the respective female outer terminal end (76) and the internal threads (124). Referring to FIGS. 3 and 9, the inner surface (68) of the male end threaded member (32) can terminate at the male outer terminal end (208), in a spaced relationship to a male outer reference axis (212).

As shown in FIGS. 3 and 9, the male outer reference axis (212) can be perpendicular to the longitudinal axis ((56), as shown in FIG. 3), and the male outer terminal end (208) can include a continuous male outer radial sealing surface (204) (e.g., front sealing surface). The male outer radial sealing surface (204) can intersect with the inner surface (68) at a respective male outer radial sealing surface inside edge (216), which comprises an inner radius (b), as shown in FIG. 3. From the male outer radial sealing surface inside edge (216), the male outer radial sealing surface (204) can extend outwardly, relative to the longitudinal axis (56), as shown in FIG. 3. The male outer radial sealing surface (204) can return and terminate at a respective continuous male outer radial sealing surface outside edge (220), in an intersecting relationship with a male first land (224).

The male outer radial sealing surface outside edge (220) has a male first radius (q), which is relative to the longitudinal axis (56). The male outer radial sealing surface outside edge (220) can be located at the male outer reference axis (212). In an embodiment, from the male outer radial sealing surface outside edge (220) to the male outer radial sealing surface inside edge (216), the male outer radial sealing surface (204) can be inclined at a negative angle (d) relative to the male outer reference axis (212) to facilitate the male outer radial sealing surface (204) being engaged with (e.g., being wedged against) a complementary female inner radial sealing surface (192, shown in FIGS. 2 and 4) of the complementary female end threaded member (24) of the second complementary joint (18) of tubular conduit.

Referring to FIGS. 3 and 9, the male first land (224) is disposed in a spaced opposed relationship to the inner surface (68). The male first land (224), in an embodiment, can intersect and terminate at the male outer radial sealing surface outside edge (220). At the male outer radial sealing surface outside edge (220), the male first land (224) can have the male first radius (q). The male first land (224) can extend from the male outer radial sealing surface outside edge (220) to a continuous male first thread transition boundary (228) spaced therefrom. At the male first thread transition boundary (228), the male first land (224) can have a respective male second radius (s) relative to the longitudinal axis (56, shown in FIG. 3). From the male first radius (q) at the male outer radial sealing surface outside edge (220) to the male second radius (s) at the male first thread transition boundary (228), the male first land (224) can taper outwardly in relation to the longitudinal axis (56). The male first land (224) can include a continuous male first axial sealing surface (232) (e.g., first external sealing surface) intermediate the male outer radial sealing surface outside edge (220) and a male first axial sealing surface transition axis (236).

Referring to FIGS. 3 and 9, at the male outer radial sealing surface outside edge (220), the male outer radial sealing surface (232) has the male first radius (q). At the male first axial sealing surface transition axis (236), the male outer radial sealing surface (232) has a first external seal radius (q'). As shown, the male first axial sealing surface (232) (e.g., first external sealing surface) can include a respective projected annular area, which can be defined along a reference axis extending perpendicular to the longitudinal axis (56), and the projected annular area can be defined as the area between the male first radius (q) and first external seal radius (q'). The male first axial sealing surface transition axis (236) can be located intermediate the male outer radial sealing surface outside edge (220) and male first thread transition boundary (228).

Referring to FIGS. 3 and 9, the male first axial sealing surface (232) can extend in circumferential relation to the longitudinal axis (56). As shown, the male first axial sealing surface transition axis (236) divides a male first land outer segment (240), having a male first taper angle (t), from a male first land inner segment (248) having a male second taper angle (u) extending on opposite sides thereof. The male first land outer segment (240) can extend from the male outer radial sealing surface outside edge (220) to the male seal transition axis (236). Male first land inner segment (248) extends from the male first thread transition boundary (228) to the male seal transition axis (236). In the embodiment illustrated in FIG. 3, the male first axial sealing surface (232) has a width extending from the male outer radial sealing surface outside edge (220) to the male seal transition axis (236). It will be understood that, in other embodiments, that width of the male first axial sealing surface (232) can differ.

Figure 4:
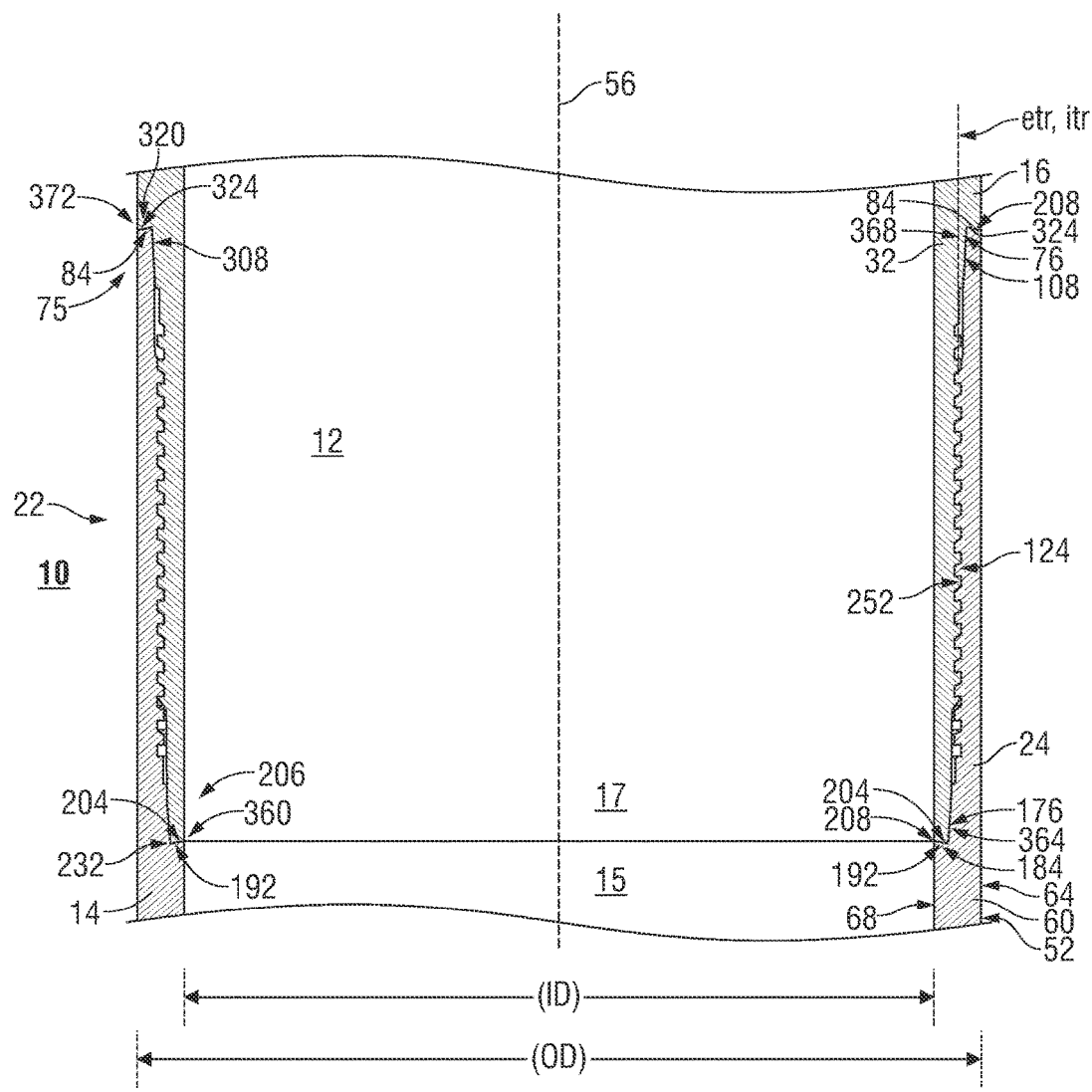
FIG. 4 depicts a cross-sectional view of an embodiment of a connection formed through engagement between the female member of FIG. 2 and the male member of FIG. 3.

In the embodiment illustrated in FIG. 3, the male first taper angle (t) exceeds the male second taper angle (u). In other embodiments (not shown), the male first taper angle (t) may be equal to the male second taper angle (u). The male first axial sealing surface (232) can be located to mate with a complementary female first axial sealing surface (108, as shown in FIGS. 2 and 4, in sealing engagement therewith It will be understood that the radius of male first axial sealing surface (232) can vary along the longitudinal direction, having a value between male first radius (q) and male second radius (s).

Referring to FIG. 3, the male end threaded member (24) (e.g., male connector end or male end) has external threads (252) formed in the wall structure (60) in a spaced opposed relationship to the inner surface (68). The external threads (252) can be located between the first external sealing surface and the second external sealing surface, and the external threads (252) can have a thread entry point (256) proximate to the male first thread transition boundary (228). The external threads (252) can have a thread pullout (260) proximate to a male second thread transition boundary (264), and the male second thread transition boundary (264) can be spaced from the male first thread transition boundary (228). The male first thread transition boundary (228) has the male second radius (s), and the male second thread transition boundary (264) has a respective male third radius (v), which is relative to the longitudinal axis (56). From the thread entry point (256) to the thread pullout (260), the external threads (252) can have a constant radius (etr) relative to the longitudinal axis (56). Thus, the external threads (252) can be parallel to the longitudinal axis (56), and the external threads do not taper relative to the longitudinal axis (56). It will be understood that, in an embodiment, the external threads (252) can comprise minor tapered sections or can taper to an incidental or negligible extent, or may be offset along a centerline spaced from longitudinal axis (56).

Figure 6:
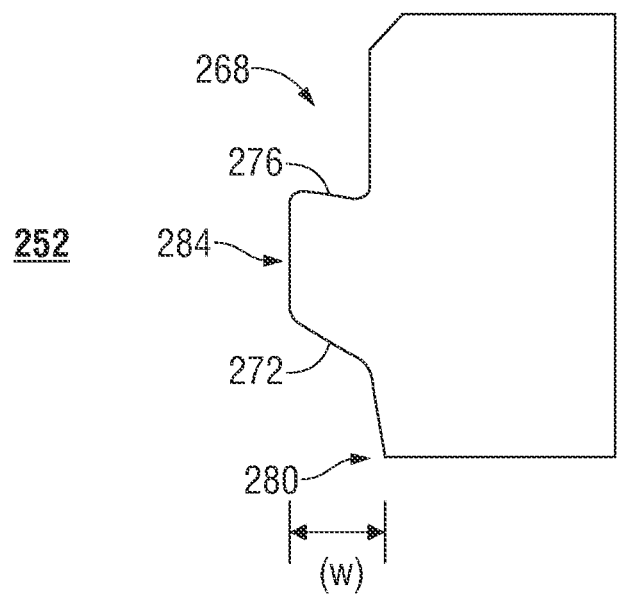
FIG. 6 depicts a diagrammatic view of an embodiment of threads of the connection of FIG. 4.

Referring to FIG. 6, the external threads (252) can have a buttress thread form (268). In the embodiment as illustrated in FIG. 6, the external threads (252) can have a buttress thread form (268) with an inclined forward face (272) and a negatively inclined rear face (276). The external threads (252) can have a root (280) and a top (284) spaced apart from the root (280). The external threads (252) can have a thread height (w) from top (284) to root (280). In an embodiment, the forward face (272) may be inclined, for example, about thirty degrees relative to a perpendicular axis. In an embodiment, the rear face (276) may be negatively inclined, for example, about nine degrees relative to a perpendicular axis. Referring to FIG. 4, it will be understood that the external threads (252), having a buttress thread form (268, shown in FIG. 6) can have a relatively low height (w) to thread length relationship, allowing the segment or joint of tubular conduit to maintain sufficient wall thickness to withstand a larger axial stress, as compared to segments or joints having a large thread height to thread width ratio.

Upon being torqued with a suitable force, the external threads (252) of the male end threaded member (e.g., male end or male connector end), having a buttress thread form (268, shown in FIG. 6) and in mating engagement with the internal threads (124) of a complementary female end threaded member (24) (e.g., female end or female connector end), having buttress thread form (140, shown in FIG. 5), can bear and impart high compression forces so as to thrust and retain the male outer terminal end (208) against the female inner terminal end (184), with the male outer radial sealing surface (204) being captured by (e.g., being wedged against), and in mating sealing engagement with, the complementary female inner radial sealing surface (192) of the complementary female end threaded member (24) of the second complementary joint (18) of tubular conduit (e.g., second fluid connector). It will be understood that the female inner radial sealing surface (192) is a thrust surface in opposition to compressive forces imparted from the male outer radial sealing surface (204), being thrust or urged by the external threads (252) when torqued.

Referring to FIG. 3, the male end threaded member (32) can have a continuous male second land (288) formed in the wall structure (60) proximate the male second thread transition boundary (264). The male second land (288) may be formed by tool clearance incidental to forming the external threads (252), and the male second land (288) can be spaced outward from the male second thread transition boundary (264) in the radial direction relative to the longitudinal axis (56). As shown, the male second land (288) has a respective male fourth radius (x) relative to the longitudinal axis (56), and the male fourth radius (x) is greater than the male third radius (v). The male second land (288) can extend in the longitudinal direction from the male second thread transition boundary (264) to a male inner sealing shoulder (292, shown in FIGS. 3 and 7), spaced therefrom. The male inner sealing shoulder (292) can intersect the male second land (288) at a continuous male inner shoulder inside corner (296). The male inner sealing shoulder (292) can extend outward relative to the longitudinal axis (56) from the male inner shoulder inside corner (296) to a continuous male inner shoulder outside edge (304). As shown, the male inner shoulder outside edge (304) has a male fifth radius (y) relative to the longitudinal axis (56). The male fifth radius (y) is larger than the male fourth radius (x). It will be understood that the male inner shoulder outside edge (304) defines a continuous male second axial sealing surface (308) (e.g. second external sealing surface), the male second axial sealing surface (308) can extend in circumferential relationship to the longitudinal axis (56).

Figure 7:
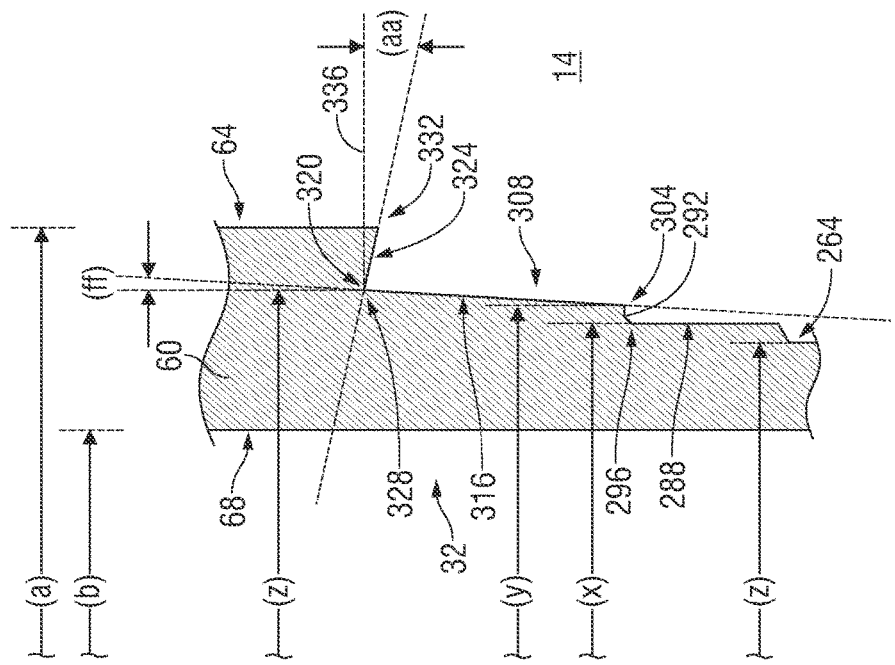
FIG. 7 depicts an enlarged partial view of a male member of a tubular conduit usable within the scope of the present disclosure and indicated by numeral 7 in FIG. 3.

Referring to FIGS. 3 and 7, the male end threaded member (32) can have a continuous male third land (316) formed in the wall structure (60), in an intersecting relationship with the male inner shoulder outside edge (304). The male third land (316) can be spaced outward from the male second land (288), relative to the longitudinal axis (56). At the male inner shoulder outside edge (304), the male third land (316) has the male fifth radius (y) relative to the longitudinal axis (56), and the male fifth radius (y) exceeds the male fourth radius (x). The male third land (316) can extend in the longitudinal direction, from the male inner shoulder outside edge (304) to a male inner terminal end (320). In the embodiment illustrated in FIG. 3, the male second axial sealing surface (308) has a width extending from the male inner shoulder outside edge (304) to the male inner radial sealing surface inside corner (328). In other embodiments, the width of the male second axial sealing surface (308) can differ. The male third land (316) intersects and terminates at the male inner terminal end (320). The male inner terminal end (320) can have a continuous male inner radial sealing surface (324) (e.g., external shoulder) that can intersect the male third land (316) at a respective male inner radial sealing surface inside corner (328). The male third land (316), at the male inner radial sealing surface inside corner (328), has a male sixth radius (z) relative to the longitudinal axis (56), and the male sixth radius (z) can exceed the male fifth radius (y), as shown. From the male inner shoulder outside edge (304) to the male inner radial sealing surface inside corner (328), the male third land (316) can taper outward, relative to the longitudinal axis (56). It will be understood that the radius of male second axial sealing surface (308) can vary along the longitudinal direction, having a value between male fifth radius (y) and male sixth radius (z).

The male second axial sealing surface (308) (e.g., second external sealing surface) can taper inward at a respective taper angle (ff) (shown in FIG. 7) relative to the male sixth radius (z). Particularly, in the embodiment illustrated in FIG. 7, the male second axial sealing surface (308) (e.g., second external sealing surface) can taper inward relative to male sixth radius (x) at the male inner radial sealing surface inside corner (328) to the male inner shoulder outside edge (304), at taper angle (ff). The taper angle (ff) can be slightly less than a corresponding first taper angle (g) (shown in FIG. 8) of female first axial sealing surface (108) (e.g., first internal sealing surface), of the corresponding female end threaded member (24), to provide sealing interference between the male second axial sealing surface (308) and the female first axial sealing surface (108). Referring again to FIG. 7, it will be understood that the taper angle (ff) can differ from corresponding first taper angle (g) (shown in FIG. 8) by about one degree, for example. It will be understood that the male second axial sealing surface (308) (e.g., second external sealing surface) has a respective projected annular area defined along a reference axis extending perpendicular to the longitudinal axis (56), and that the projected annular area is that area between the male fifth radius (y) and male sixth radius (z).

Referring to FIGS. 3 and 7, from the male inner radial sealing surface inside corner (328), the male inner radial sealing surface (324) (e.g. external shoulder) can extend outwardly relative to the longitudinal axis and from the second external surface adjacent thereto. The male inner radial sealing surface (324) (e.g., external shoulder), thus, can return and extend out in the radial direction relative to the longitudinal axis (56) to a male inner radial sealing surface outside edge (332). The male inner radial sealing surface (324) at the male inner radial sealing surface outside edge (332), thereof, can intersect and terminate at the outer surface (64), and the male inner radial sealing surface outside edge (332) can have the outer radius (a). The male inner radial sealing surface inside corner (328) can be located at a male inner reference axis (336). As shown, the male inner reference axis (336) can be perpendicular to the longitudinal axis (56). From the male inner radial sealing surface inside corner (328) to the male inner radial sealing surface outside edge (332), the male inner radial sealing surface (324) can be inclined at a negative angle (aa) relative to the male inner reference axis (336) to facilitate the male inner radial sealing surface (324) capturing or engaging (e.g., being wedged against) with a complementary female outer radial sealing surface (84, as shown in FIGS. 2 and 4) of the complementary female end threaded member (24) (e.g., female connector end or female end) of the second complementary joint (18) of tubular conduit (e.g., second fluid connector). Thus, the external shoulder can extend diagonally with respect to the longitudinal axis (56) of the first fluid connector (14), and the external shoulder can extend outwardly with respect to the longitudinal axis (56) of the first fluid connector (14) in the direction of the external threads (252). It will be understood that the male inner radial sealing surface (324) (e.g. external shoulder) has a respective projected annular area defined along a reference axis extending perpendicular to the longitudinal axis (56), and that the projected annular area can be defined as the area between the outer radius (a) and male sixth radius (z).

Referring to FIG. 4, in an embodiment, the projected annular area of the external shoulder (324), which is the area between the outer radius (a) and the male sixth radius (z) as shown in FIG. 3, can be essentially identical to the projected annular area of the internal shoulder (192), which is the area between the inner radius (b) and the female sixth radius (n), as shown in FIG. 2. In an embodiment, the projected annular area of the combined external shoulder (324) and second external surface (308), which is the area between the outer radius (a) and the male fifth radius (y), as shown in FIG. 3, can be essentially equal to the projected annular area of the combined internal shoulder (192) and the second internal sealing surface (176), which is the area between the inner radius (b) and the female fifth radius (m), as shown in FIG. 2. Because the external shoulder (324) and the second external surface (308) can be positioned radially outwards from the internal shoulder (192) and the second internal sealing surface (176), relative to the longitudinal axis (56), the width of the projected annular areas of the shoulders (324, 192) and the second surfaces (308, 176) may be different in order to maintain the respective projected annular areas as essentially the same, as discussed above.

Specifically, the width of the projected annular areas of the external shoulder (324) and the second external surface (308) may be smaller than the width of the projected annular areas of the internal shoulder (192) and the second internal sealing surface (176) in order for the respective projected annular areas to be essentially the same. The shoulders (324, 192) and the second surfaces (308, 176) are load bearing areas, between the adjacent joints (14, 16). Having essentially identical projected annular areas of the shoulders (324, 192) and the second surfaces (308, 176) can enable an equal distribution of stress at the connection (22). Specifically, the walls (60) of the male connector end (32) and the female connector end (24) can be subjected to essentially equal stresses during operations, thereby preventing structural failure at the connection (22). Unequal stress distributions or stress concentrations in portions of the male or female connector ends (32, 24), can result in structural failure of a portion of the connection (22), the entire connection (22), or failure of the seal integrity.

Referring to the embodiment shown in FIG. 4, the external threads (252) of the male connector end can engage the internal threads (124) of the female connector end, and the external threads (252) of the male connector end and the internal threads (124) of the female connector end are parallel threads. As shown, the inside diameter (ID) of the male connector end is essentially the same as the inside diameter (ID) of the female connector end, and the outside diameter (OD) of the male connector end is essentially the same as the outside diameter (OD) of the female connector, such that engagement between the male connector end (32) of the first fluid connector (14) and the female connector end (24) of the second fluid connector (18) can join the bore (17) of the first fluid connector with the bore (15) of the second fluid connector to define a flowpath for communicating a medium.

The front sealing surface of the male connector end (32) can contact the internal shoulder of the female connector end (24) to form a metal-to-metal seal (360) therebetween. The front sealing surface of the female connector end (24) can contact the external shoulder of the male connector end (32) to form a metal-to-metal seal (372) therebetween. The first external sealing surface of the male connector end (32) can contact the second internal sealing surface of the female connector end (24) to form a metal-to-metal seal (364) therebetween. The first internal sealing surface of the female connector end (24) can contact the second external shoulder of the male connector end (24) to form a metal-to-metal seal (368) therebetween.

The nose section (206) of the male connector end (32) can axially compress against the internal shoulder to elastically deform the nose section (206) of the male connector end along the longitudinal axis (56) of the first fluid connector (14). The nose section (75) of the female connector end (24) can axially compress against the external shoulder to elastically deform the nose section (75) of the female connector end along the longitudinal axis (56) of the second fluid connector (18). Axial compression, thus, can be maintained in the elongated nose section (75) of the female connector end and maintained in the elongated nose section (206) of the male connector end while the first fluid connector and second fluid connector are in tension with respect to each other, such as during use. In embodiments, such compression can be maintained during use, without interruption.

As depicted in FIG. 4, upon full engagement between the male connector end (32) and the female connector end (24), the nose sections (75, 206) are axially compressed against the internal and external shoulders (192, 324) resulting in the nose sections (75, 206) undergoing elastic axial strain along the longitudinal axis (56). The internal stored elastic strain enables the front sealing surfaces (84, 204) to be in contact and compression against the internal and external shoulders (192, 324), during several downwell operations. This includes operations involving the tubular conduit string (10) undergoing bending at the threaded connection (22), which can result in tension between certain portions of the threads (124, 252). Other operations, such as lifting of the tubular string (10), also result in tension between each joint (14), and specifically, between the threads (124, 252). Although the threads (124, 252) may experience axial strain therebetween, along the longitudinal axis (56), the axial stress/strain, stored in the nose sections (75, 206), compensates for any axial strain between the threads (124, 252). Specifically, as the threads (124, 252) and/or the wall (60) adjacent to the threads (124, 252) undergoes strain (e.g., elongation), the nose sections (75, 206) expand along the longitudinal axis (56) to maintain the front sealing surfaces (204, 84) in contact and compression against the internal and external shoulders (192, 325), thereby maintaining the metal-to-metal seal therebetween.

Referring still to FIG. 4, the external threads (252) can have a constant radius (etr) and buttress thread form (268, shown in FIG. 6) and can be straight or parallel to the longitudinal axis (56), with no taper relative thereto. The internal threads (124) can have a constant radius (itr) and a respective buttress thread form (140, shown in FIG. 5) and can be straight or parallel to the longitudinal axis (56), with no taper relative thereto. When torqued in a mating threaded engagement with sufficient force, which can bear and impart high compression forces to the threads, the male inner terminal end (320) can be continuously thrust and retained against the female outer terminal end (76), with the male inner radial sealing surface (324) of the first complementary segment or joint (16) of tubular conduit (12) capturing, in a fluid-tight mating sealing engagement, the complementary female outer radial sealing surface (84) of the female end threaded member (24) of the segment or joint (14) of tubular conduit, and so as to continuously thrust and retain the female inner terminal end (184) of female end threaded member (24) against the male outer terminal end (208) of male end threaded member (32), with the female inner radial sealing surface (192) capturing, in mating sealing engagement, the complementary male outer radial sealing surface (204). The male inner radial sealing surface (324) can be a thrust surface in opposition to compressive forces that can be imparted from the female outer radial sealing surface (84) being thrust or urged by a mating threaded engagement of the internal threads (124) with the external threads (252), when torqued. In addition, the female inner radial sealing surface (192) can be a thrust surface in opposition to compressive forces imparted from the male outer radial sealing surface (204) being thrust or urged by a mating threaded engagement of the internal threads (124) and the external threads (252), when torqued. It will be understood that in such embodiments, upon the internal threads (124) and the external threads (252) being torqued by application of sufficient force, the male first axial sealing surface (232) can be forced and maintained in a mating sealing engagement with the female second axial sealing surface (176), and the male second axial sealing surface (308) can be forced and maintained in mating sealing engagement with the female first axial sealing surface (108).

Referring to FIG. 4, embodiments of the present invention thereby provide tubular conduit strings (10), including a plurality of joints (14) of tubular conduit (12) joined by respective threaded connections (22) formed and made up between complementary female end threaded members (24) and male end threaded members (32), each formed in the wall structure (60), and thus having a flush fit or engagement with both the outer surface (64) and the inner surface (68). Embodiments of the present invention provide such tubular conduit strings (10), including a plurality of segments or joints (14) of tubular conduit (12) having a configuration including sealing surfaces that provide improved fluid-tight integrity, which can be suitable for down-hole use in oilfield applications, wherein high fluid pressure must be maintained, and particularly for use in directional boreholes, wherein the tubular conduit string (10) can be curved to fit curves of such directional boreholes. Embodiments of the present invention provide such tubular conduit strings (10), including a plurality of segments or joints (14) of tubular conduit (12) that are of suitable flexibility and that are stable under lateral forces, bending forces, and combinations thereof. Embodiments of the present invention provide such tubular conduit strings (10), including a plurality of segments or joints (14) of tubular conduit (12), wherein the threaded connections (20) thereof are maintained in compression during use.

Embodiments of the present invention provide such tubular conduit strings (10), including a plurality of segments or joints (14) of tubular conduit, wherein made up threaded connections (22) thereof can include two metal-to-metal radial seals defined, for example, by compression of opposing thrust surfaces which include particularly: a first radial seal (360) defined by a female inner radial sealing surface (192) in mating sealing engagement with a captured male outer radial sealing surface (204) at one end thereof, and a second radial seal (372) defined by a male inner radial sealing surface (324) in mating sealing engagement with a captured female outer radial sealing surface (84) at the other end thereof.

Embodiments of the present invention provide such tubular conduit strings (10), including a plurality of segments or joints (14) of tubular conduit, wherein made up threaded connections (22) thereof can include two metal-to-metal axial seals defined, for example, by interference fit sealing engagement of opposing sealing surfaces, which can include, particularly: a first axial seal (364) defined by a female second axial sealing surface (176) in mating sealing engagement with an opposing male first axial sealing surface (232), and a second axial seal (368) defined by a male second axial sealing surface (308) in mating sealing engagement with an opposing female first axial sealing surface (108). Embodiments provide such tubular conduit strings (10), including a plurality of segments or joints (14) of tubular conduit, wherein the threaded connections (22) thereof have reduced, or eliminated, galling and/or destructive deformation of the threads, such as through plastic and/or elastic deformation of the members.

Figure 11:
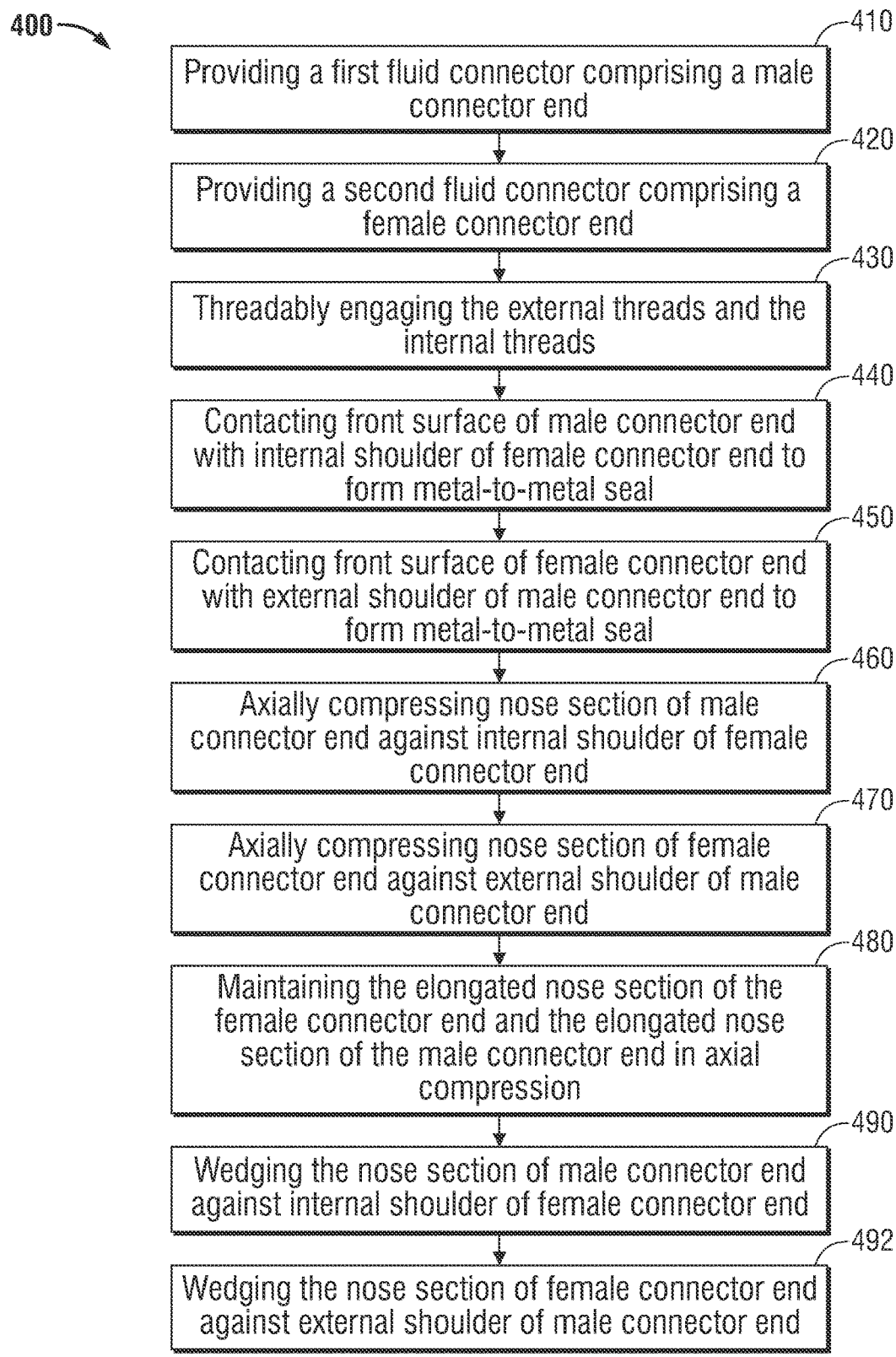
FIG. 11 depicts a diagrammatic representation of a method of forming a fluid connection.

Referring to FIG. 11, embodiments provide a method (400) of forming a fluid connection. One will understand that the method (400) can be practiced with apparatus as herein disclosed. Method (400) includes the step of providing (410) a first fluid connector. A suitable first fluid connector can be, for example, identical to a first fluid connector (14) as described herein, wherein the first fluid connector can have a generally cylindrical shape with a bore extending therethrough along a longitudinal axis thereof. The first fluid connector can include a male connector end having an elongated nose section, which can comprise a front surface and a first external surface, an external shoulder extending outwardly relative to the longitudinal axis, a second external surface adjacent the external shoulder, and external threads between the first external surface and the second external surface.

Method (400) includes the step of providing (420) a second fluid connector. A suitable second fluid connector can be, for example, identical to the second fluid connector (18) as described herein, wherein the second fluid connector (18) can have a generally cylindrical shape with a bore extending therethrough along a longitudinal axis thereof. The second fluid connector can include a female connector end having an elongated nose section, which can comprise a front surface and a first internal surface, an internal shoulder extending inwardly relative to the longitudinal axis, a second internal surface adjacent the internal shoulder, and internal threads between the first internal surface and the second internal surface.

Method (400) includes the step of threadably engaging (430) the external threads with the internal threads for forming a mating threadable engagement.

Method (400) includes the step of contacting (440) the front surface of the male connector end with the internal shoulder of the female connector end, thereby forming a metal-to-metal fluid seal therebetween.

Method (400) includes the step of contacting (450) the front surface of the female connector end with the external shoulder of the female connector end, thereby forming a metal-to-metal fluid seal therebetween.

Method (400) includes the step of axially compressing (460) the elongated nose section of the male connector end against the internal shoulder to elastically deform the elongated nose section of the male connector end along the longitudinal axis of the first fluid connector.

Method (400) includes the step of axially compressing (470) the elongated nose section of the female connector end against the external shoulder to elastically deform the elongated nose section of the female connector end along the longitudinal axis of the second fluid connector.

Method (400) includes the step of maintaining (480) the elongated nose section of the female connector end and the elongated nose section of the male connector end in axial compression while the male connector end and the female connector end are in tension with respect to each other.

It will be understood that, optionally, method (400) can further include the step of wedging (490) the elongated nose section of the male connector end against the internal shoulder, thereby maintaining the front surface of the male connector end against the internal shoulder during the axial compression of the elongated nose section of the male connector.

It will be understood that, optionally, method (400) can further include the step of wedging (492) the elongated nose section of the female connector end against the external shoulder, thereby maintaining the front surface of the female connector end against the external shoulder during the axial compression of the elongated nose section of the female connector.

In an embodiment, the method (400) can further include the step of allowing the elongated nose section of the male connector end to expand along the longitudinal axis of the first fluid connector, when an adjacent wall of the female connector end is in tension, to maintain contact between the front surface of the male connector end and the internal shoulder of the female connector end, thereby maintaining a metal-to-metal fluid seal therebetween. In addition, the method (400) can include allowing the elongated nose section of the female connector end to expand along the longitudinal axis of the second fluid connector, when an adjacent wall of the male connector end is in tension, to maintain contact between the front surface of the female connector end and the external shoulder of the male connector end, thereby maintaining the metal-to-metal fluid seal therebetween.

In an embodiment, the method (400) can include providing the external shoulder of the male connector end with a projected annular area that is essentially the same as a projected annular area of the internal shoulder of the female connector end to distribute stress essentially equally between the external shoulder and the internal shoulder. The method (400) can further include providing the external shoulder and the second external surface with a projected annular area that is essentially the same as a projected annular area of the internal shoulder and the second internal surface.

In an embodiment, the method (400) can include providing the elongated nose section of the male connector end, having a cross-sectional area along a first plane perpendicular to the longitudinal axis of the first fluid connector, which is essentially the same as a cross-sectional area of the elongated nose section of the female connector end along a second plane perpendicular to the longitudinal axis of the second fluid connector, for essentially equalizing axial stress in the elongated nose section of the male connector end, along the first plane, with the axial stress in the elongated nose section of the female connector end, along the second plane.

In an embodiment, the method (400) can further comprise providing the male connector end, having essentially the same cross-sectional areas as corresponding portions of the female connector end along a plane extending perpendicularly with respect to the longitudinal axis of the first fluid connector and the second fluid connector respectively, thereby equalizing axial stress in the male connector end with the axial stress in the corresponding portions of the female connector end.

Figure 12:
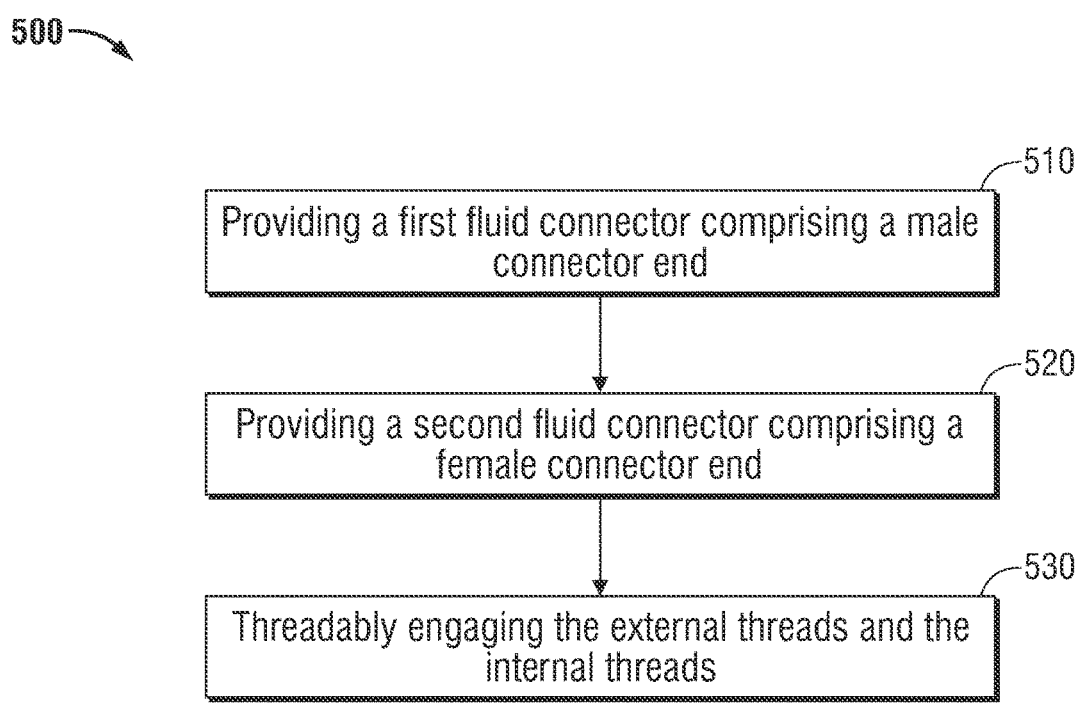
FIG. 12 depicts a diagrammatic representation of a method of forming a fluid connection.

Referring to FIG. 12, the embodiments provide a method (500) of forming a fluid connection, wherein the method (500) comprises the step of providing a first fluid connector (510), which can comprise a male end having a generally cylindrical shape with a bore extending therethrough along a longitudinal axis thereof. The male end can comprise a nose section, which can have a front surface and a first outer surface. The male end can comprise a second outer surface and an external shoulder extending from the second outer surface, and external threads that can be located between the first outer surface and the second outer surface.

In addition to providing the first fluid connector, the method (500) can include the step of providing a second fluid connector (520), which can comprise a female end having a generally cylindrical shape with a bore extending therethrough along a longitudinal axis thereof. The female end can comprise a nose section, which can have a front surface and a first inner surface. In addition, the female end can comprise a second inner surface and an internal shoulder extending from the second inner surface, and internal threads that can be located between the first inner surface and the second inner surface. The method (500) can continue by threadably engaging the external threads of the male connector end with the internal threads of the female connector end (530), wherein the external threads of the male connector end and the internal threads of the female connector end have parallel threads.

Optionally, the method (500) for forming a fluid connection can comprise the steps of compressing the nose section of the male end against the internal shoulder of the female end to form a first metal-to-metal seal therebetween and to elastically strain the nose section of the male end along the longitudinal axis of the male end, and compressing the nose section of the female end against the external shoulder of the male end to form a second metal-to-metal seal therebetween and to elastically strain the nose section of the female end along the longitudinal axis of the female end. The steps of the method (500) can further include expanding the nose section of the male end along the longitudinal axis thereof, when the adjacent wall of the female end is in tension, to maintain compression against the internal shoulder of the female end and to maintain the first metal-to-metal seal; and expanding the nose section of the female end along the longitudinal axis thereof, when the adjacent wall of the male end is in tension, to maintain compression against the external shoulder of the male end and to maintain the second metal-to-metal seal.

In an embodiment of the method (500), portions of the male end, along the longitudinal axis, can have essentially the same cross-sectional area as corresponding portions of the female end along the longitudinal axis, thereby equalizing axial stress in portions of the male end along the longitudinal axis with the axial stress in the corresponding portions of the female connector end along the longitudinal axis.

In an embodiment, the method (500) can further comprise the step of providing the external shoulder of the male end, with a projected annular area that is essentially the same as a projected annular area of the internal shoulder of the female end, for distributing stress essentially equally between the external shoulder and the internal shoulder.

In an embodiment of the method (500), the method steps can further comprise providing the nose section of the male end with a cross-sectional area, taken along a first plane perpendicular to the longitudinal axis of the male end, that is essentially the same as a cross-sectional area of the nose section of the female end, taken along a second plane perpendicular to the longitudinal axis of the female end, for essentially equalizing the axial stress in the nose section of the male end, along the first plane, with the axial stress in the nose section of the female end, along the second plane.

While various embodiments of the present invention have been described with emphasis, it should be understood that within the scope of the appended claims, the present invention might be practiced other than as specifically described herein.

What is claimed is:

1. A fluid connector assembly comprising:
   a first fluid connector having a generally cylindrical shape with a bore extending therethrough along a longitudinal axis thereof, wherein the first fluid connector comprises:
      a male connector end having an inside diameter and an outside diameter, wherein the male connector end comprises:
         a nose section comprising a front sealing surface and a first external sealing surface;
         an external shoulder extending outwardly relative to the longitudinal axis, a second external sealing surface adjacent the external shoulder and extending at an angle with respect to the longitudinal axis, an inner male sealing shoulder adjacent the second external sealing surface and extending perpendicular to the longitudinal axis, an inside corner extending from the inner male sealing shoulder at an angle with respect to the longitudinal axis, a first land extending from the inside corner and being parallel with the longitudinal axis, a transition surface extending from the first land at an angle with respect to the longitudinal axis, and a second land extending from the transition surface and being parallel with the longitudinal axis; and
         external threads between the first external sealing surface and the second external sealing surface; and
   a second fluid connector having a generally cylindrical shape with a bore extending therethrough along a longitudinal axis thereof, wherein the second fluid connector comprises:
      a female connector end having an inside diameter and an outside diameter, wherein the female connector end comprises:
         a nose section comprising a front sealing surface and a first internal sealing surface;
         an internal shoulder extending inwardly relative to the longitudinal axis, a second internal sealing surface adjacent the internal shoulder, and an inner female sealing shoulder adjacent the second internal sealing surface; and
         internal threads between the first internal sealing surface and the second internal sealing surface,
      wherein the external threads of the male connector end engage the internal threads of the female connector end,
      wherein the external threads of the male connector end and the internal threads of the female connector end have parallel threads,
   wherein the inside diameter of the male connector end is essentially the same as the inside diameter of the female connector end, wherein the outside diameter of the male connector end is essentially the same as the outside diameter of the female connector, wherein engagement between the male connector end of the first fluid connector and the female connector end of the second fluid connector joins the bore of the first connector with the bore of the second connector to define a flowpath for communicating a medium, and
   wherein the front sealing surface of the male connector end contacts the internal shoulder of the female connector end to form a metal-to-metal seal therebetween, wherein the front sealing surface of the female connector end contacts the external shoulder of the male connector end to form a metal-to-metal seal therebetween, wherein the first external sealing surface of the male connector end contacts the second internal sealing surface of the female connector end to form a metal-to-metal seal therebetween, wherein the first internal sealing surface of the female connector end contacts the second external sealing surface of the male connector end to form a metal-to-metal seal therebetween.

2. The fluid connector assembly of claim 1, wherein the length of the nose section of the male connector end is essentially the same as the length of the nose section of the female connector end, wherein the nose section of the male connector end expands axially to maintain contact with the female connector end when the first fluid connector and the second fluid connector are in tension with respect to each other, wherein the nose section of the female connector end expands axially to maintain contact with the male connector end when the first fluid connector and the second fluid connector are in tension with respect to each other.

3. The fluid connector assembly of claim 1, wherein a projected annular area of the external shoulder of the male connector end is essentially the same as a projected annular area of the internal shoulder of the female connector end.

4. The fluid connector assembly of claim 1, wherein a projected annular area of the external shoulder and the second external sealing surface is essentially the same as a projected annular area of the internal shoulder and the second internal sealing surface.

5. The fluid connector assembly of claim 1, wherein the cross-sectional area of the nose section of the male connector end, along a plane perpendicular to the longitudinal axis of the first fluid connector, is essentially the same as a cross-sectional area of the nose section of the female connector end along a plane perpendicular to the longitudinal axis of the second fluid connector.

6. The fluid connector assembly of claim 1, wherein the external shoulder extends diagonally with respect to the longitudinal axis of the first fluid connector, wherein the external shoulder extends outwardly with respect to the longitudinal axis of the first fluid connector in the direction of the external threads, wherein the internal shoulder extends diagonally with respect to the longitudinal axis of the second fluid connector, wherein the internal shoulder extends inwardly with respect to the longitudinal axis of the second fluid connector in the direction of the internal threads.

7. The fluid connector assembly of claim 1, wherein the nose section of the male connector end is axially compressed against the internal shoulder of the female connector end to elastically deform the nose section of the male connector end along the longitudinal axis of the first fluid connector, wherein the nose section of the female connector end is axially compressed against the external shoulder of the male connector end to elastically deform the nose section of the female connector end along the longitudinal axis of the second fluid connector, wherein the elongated nose section of the female connector end contacts the external shoulder when the first fluid connector and the second fluid connector are in tension with respect to each other, wherein the elongated nose section of the male connector end contacts the internal shoulder when the first fluid connector and the second fluid connector are in tension with respect to each other.

8. A method of forming a fluid connection, the method comprising the steps of:
   providing a first fluid connector having a generally cylindrical shape with a bore extending therethrough along a longitudinal axis thereof, wherein the first fluid connector comprises:
      a male connector end comprising:
         an elongated nose section comprising a front surface and a first external surface;
         an external shoulder extending outwardly relative to the longitudinal axis and a second external surface adjacent the external shoulder and extending at an angle with respect to the longitudinal axis, an inner male sealing shoulder adjacent the second external surface and extending perpendicular to the longitudinal axis, an inside corner extending from the inner male sealing shoulder at an angle with respect to the longitudinal axis, a first land extending from the inside corner and being parallel with the longitudinal axis, a transition surface extending from the first land at an angle with respect to the longitudinal axis, and a second land extending from the transition surface and being parallel with the longitudinal axis; and
         external threads between the first external surface and the second external surface;
   providing a second fluid connector having a generally cylindrical shape with a bore extending therethrough along a longitudinal axis thereof, wherein the second fluid connector comprises:
      a female connector end comprising:
         an elongated nose section comprising a front surface and a first internal surface;
         an internal shoulder extending inwardly relative to the longitudinal axis, a second internal surface adjacent the internal shoulder, and an inner female sealing shoulder adjacent the second internal surface; and
         internal threads between the first internal surface and the second internal surface;
   threadably engaging the external threads with the internal threads;
   contacting the front surface of the male connector end with the internal shoulder of the female connector end, thereby forming a metal-to-metal fluid seal therebetween;
   contacting the front surface of the female connector end with the external shoulder of the female connector end, thereby forming a metal-to-metal fluid seal therebetween;
   axially compressing the elongated nose section of the male connector end against the internal shoulder of the female connector end to elastically deform the elongated nose section of the male connector end along the longitudinal axis of the first fluid connector; and
   axially compressing the elongated nose section of the female connector end against the external shoulder of the male connector end to elastically deform the elongated nose section of the female connector end along the longitudinal axis of the second fluid connector.

9. The method of claim 8, further comprising the steps of:
   axially expanding the elongated nose section of the female connector end to maintain contact with the male connector end when the first fluid connector and the second fluid connector are in tension with respect to each other; and
   axially expanding the elongated nose section of the male connector end to maintain contact with the female connector end when the first fluid connector and the second fluid connector are in tension with respect to each other.

10. The method of claim 8, further comprising the steps of:
    allowing the elongated nose section of the male connector end to expand along the longitudinal axis of the first fluid connector when an adjacent wall of the female connector end is in tension to maintain contact between the front surface of the male connector end and the internal shoulder of the female connector end, thereby maintaining the metal-to-metal fluid seal therebetween; and
    allowing the elongated nose section of the female connector end to expand along the longitudinal axis of the second fluid connector when an adjacent wall of the male connector end is in tension to maintain contact between the front surface of the female connector end and the external shoulder of the male connector end, thereby maintaining the metal-to-metal fluid seal therebetween.

11. The method of claim 8, further comprising:
    wedging the elongated nose section of the male connector end against the internal shoulder of the female connector end, thereby maintaining the front surface of the male connector end against the internal shoulder during the axial compression of the elongated nose section of the male connector; and
    wedging the elongated nose section of the female connector end against the external shoulder of the male connector end, thereby maintaining the front surface of the female connector end against the external shoulder during the axial compression of the elongated nose section of the female connector.

12. The method of claim 8, further comprising providing the external shoulder of the male connector end with a projected annular area that is essentially the same as a projected annular area of the internal shoulder of the female connector end to distribute stress essentially equally between the external shoulder and the internal shoulder.

13. The method of claim 8, further comprising providing the external shoulder and the second external surface with a projected annular area that is essentially the same as a projected annular area of the internal shoulder and the second internal surface.

14. The method of claim 8, further comprising providing the elongated nose section of the male connector end having a cross-sectional area along a first plane perpendicular to the longitudinal axis of the first fluid connector that is essentially the same as a cross-sectional area of the elongated nose section of the female connector end along a second plane perpendicular to the longitudinal axis of the second fluid connector to essentially equalize axial stress in the elongated nose section of the male connector end along the first plane with the axial stress in the elongated nose section of the female connector end along the second plane.

15. The method of claim 8, further comprising providing the male connector end having essentially the same cross-sectional areas as corresponding portions of the female connector end along a plane extending perpendicularly with respect to the longitudinal axis of the first fluid connector and the second fluid connector respectively, thereby equalizing axial stress in the male connector end with the axial stress in the corresponding portions of the female connector end.

16. A method of forming a fluid connection, the method comprising the steps of:
providing a first fluid connector comprising a male end having a generally cylindrical shape with a bore extending therethrough along a longitudinal axis thereof, wherein the male end comprises:
a nose section having a front surface and a first outer surface;
an external shoulder extending outwardly relative to the longitudinal axis, a second outer surface adjacent the external shoulder and extending at an angle with respect to the longitudinal axis, an inner male sealing shoulder adjacent the second outer surface and extending perpendicular to the longitudinal axis, an inside corner extending from the inner male sealing shoulder at an angle with respect to the longitudinal axis, a first land extending from the inside corner and being parallel with the longitudinal axis, a transition surface extending from the first land at an angle with respect to the longitudinal axis, and a second land extending from the transition surface and being parallel with the longitudinal axis; and
external threads between the first outer surface and the second outer surface;
providing a second fluid connector comprising a female end having a generally cylindrical shape with a bore extending therethrough along a longitudinal axis thereof, wherein the female end comprises:
a nose section having a front surface and a first inner surface;
a second inner surface, an internal shoulder extending inward from the second inner surface, and an internal sealing shoulder extending outward from the second inner surface; and
internal threads between the first inner surface and the second inner surface; and
engaging the external threads of the male connector end with the internal threads of the female connector end, wherein the external threads of the male connector end and the internal threads of the female connector end have parallel threads.

17. The method of claim 16, further comprising the steps of:
compressing the nose section of the male end against the internal shoulder of the female end to form a first metal-to-metal seal therebetween and to elastically strain the nose section of the male end along the longitudinal axis of the male end;
compressing the nose section of the female end against the external shoulder of the male end to form a second metal-to-metal seal therebetween and to elastically strain the nose section of the female end along the longitudinal axis of the female end;
expanding the nose section of the male end along the longitudinal axis thereof when the adjacent wall of the female end is in tension to maintain compression against the internal shoulder of the female end and to maintain the first metal-to-metal seal; and
expanding the nose section of the female end along the longitudinal axis thereof when the adjacent wall of the male end is in tension to maintain compression against the external shoulder of the male end and to maintain the second metal-to-metal seal.

18. The method of claim 16, wherein portions of the male end along the longitudinal axis have essentially the same cross-sectional area as corresponding portions of the female end along the longitudinal axis, thereby equalizing axial stress in portions of the male end along the longitudinal axis with the axial stress in the corresponding portions of the female connector end along the longitudinal axis.

19. The method of claim 16, further comprising providing the external shoulder of the male end having a projected annular area that is essentially the same as a projected annular area of the internal shoulder of the female end to distribute stress essentially equally between the external shoulder and the internal shoulder.

20. The method of claim 16, further comprising providing the nose section of the male end having a cross-sectional area along a first plane perpendicular to the longitudinal axis of the male end that is essentially the same as a cross-sectional area of the nose section of the female end along a second plane perpendicular to the longitudinal axis of the female end to essentially equalize axial stress in the nose section of the male end along the first plane with the axial stress in the nose section of the female end along the second plane.

* * * * *